United States Patent
Yin et al.

(10) Patent No.: US 9,393,539 B2
(45) Date of Patent: Jul. 19, 2016

(54) DIRECT ASSEMBLY OF HYDROPHOBIC NANOPARTICLES TO MULTIFUNCTION STRUCTURES

(75) Inventors: Yadong Yin, Riverside, CA (US); Zhenda Lu, Riverside, CA (US)

(73) Assignee: THE REGENTS OF THE UNIVERSITY OF CALIFORNIA, Oakland, CA (US)

( * ) Notice: Subject to any disclaimer, the term of this patent is extended or adjusted under 35 U.S.C. 154(b) by 158 days.

(21) Appl. No.: 14/130,333

(22) PCT Filed: Jul. 2, 2012

(86) PCT No.: PCT/US2012/000313
§ 371 (c)(1),
(2), (4) Date: Apr. 25, 2014

(87) PCT Pub. No.: WO2013/006207
PCT Pub. Date: Jan. 10, 2013

(65) Prior Publication Data
US 2014/0243189 A1 Aug. 28, 2014

Related U.S. Application Data

(60) Provisional application No. 61/503,799, filed on Jul. 1, 2011.

(51) Int. Cl.
*B01J 21/00* (2006.01)
*B01J 23/00* (2006.01)
(Continued)

(52) U.S. Cl.
CPC ............ *B01J 13/22* (2013.01); *B82Y 30/00* (2013.01); *C01B 19/04* (2013.01); *C01B 33/18* (2013.01);
(Continued)

(58) Field of Classification Search
USPC ......................................... 502/158, 100, 150
See application file for complete search history.

(56) References Cited

U.S. PATENT DOCUMENTS

| | | | |
|---|---|---|---|
| 2002/0132371 A1* | 9/2002 | Kreimer .............. | B01J 13/0008 436/525 |
| 2009/0202816 A1* | 8/2009 | Schlenoff .............. | B82Y 30/00 428/331 |

FOREIGN PATENT DOCUMENTS

| | | |
|---|---|---|
| RU | 2 336 941 C1 | 10/2008 |
| RU | 2 387 044 C1 | 4/2010 |

(Continued)

OTHER PUBLICATIONS

Extended European Search Report issued Jun. 16, 2015 by the European Patent Office in corresponding European Patent Application No. 12807741.9 (11 pages).

(Continued)

*Primary Examiner* — James McDonough
(74) *Attorney, Agent, or Firm* — Buchanan Ingersoll & Rooney PC

(57) ABSTRACT

A process that allows convenient production of multifunctional composite particles by direct self-assembly of hydrophobic nanoparticles on host nanostructures containing high density surface thiol groups is present. Hydrophobic nanoparticles of various compositions and combinations can be directly assembled onto the host surface through the strong coordination interactions between metal cations and thiol groups. The resulting structures can be further conveniently overcoated with a layer of normal silica to stabilize the assemblies and render them highly dispersible in water for biomedical applications. As the entire fabrication process does not involve complicated surface modification procedures, the hydrophobic ligands on the nanoparticles are not disturbed significantly so that they retain their original properties such as highly efficient luminescence. Multifunctional nonspherical nanostructures can be produced by using mercapto-silica coated nano-objects of arbitrary shapes as hosts for immobilizing functional nanoparticles. Multilayer structures can be achieved by repeating the mercapto-silica coating and nanoparticle immobilization processes.

15 Claims, 15 Drawing Sheets

(51) Int. Cl.
| | |
|---|---|
| B01J 25/00 | (2006.01) |
| B01J 29/00 | (2006.01) |
| B01J 31/00 | (2006.01) |
| B01J 13/22 | (2006.01) |
| B82Y 30/00 | (2011.01) |
| C01B 33/18 | (2006.01) |
| C01B 19/04 | (2006.01) |
| C01F 17/00 | (2006.01) |
| C01G 49/08 | (2006.01) |
| C09C 1/24 | (2006.01) |

(52) U.S. Cl.
CPC ............ *C01F 17/0031* (2013.01); *C01G 49/08* (2013.01); *C09C 1/24* (2013.01); *C01P 2002/82* (2013.01); *C01P 2002/84* (2013.01); *C01P 2004/04* (2013.01); *C01P 2004/32* (2013.01)

(56) References Cited

FOREIGN PATENT DOCUMENTS

| | | | |
|---|---|---|---|
| WO | WO 2005/015792 A2 | 2/2005 | |
| WO | WO 2005/049711 A2 | 6/2005 | |
| WO | 2009017525 A2 | 2/2009 | |
| WO | 2010096203 A2 | 8/2010 | |

OTHER PUBLICATIONS

Supplementary Partial European Search Report issued Feb. 27, 2015 by the European Patent Office in corresponding European Patent Application No. 12807741.9.

Hu et al., "Magnetically Responsive Photonic Nanochains", Angew. Chem. Int. Ed., vol. 50, No. 16, 2011, pp. 3747-3750.

Yi et al., "Silica-coated Nanocomposites of Magnetic Nanoparticles and Quantum Dots", J. Am. Chem. Soc., vol. 127, No. 14, pp. 4990-4991.

Lu et al., "Self-assembly and tunable plasmonic property of gold nanoparticles on mercapto-silica microspheres", J. Mater. Chem., vol. 19, No. 26, 2009, pp. 4597-4602.

Bouwman, "Self-assembled metallo-dielectric photonic crystals with composite silver/silica colloidal spheres", Conference on Lasers and Electro-Optics, Baltimore, MD, Jun. 6, 203, pp. 798-799.

International Search Report (PCT/ISA/210) mailed on Oct. 25, 2012, by the U.S. Patent Office as the International Searching Authority for International Application No. PCT/US2012/000313.

Xia Hong et al., "Fabrication of Magnetic Luminescent Nanocomposites by a Layer-by-Layer Self-Assembly Approach", Chem. Mater. 2004, vol. 16, No. 21, pp. 4022-4027.

Lu, Zhenda, et al., "Self-assembly and tunable plasmonic property of gold nanoparticles on mercapto-silica microspheres", Journal of Materials Chemistry, (2009), pp. 4597-4602, vol. 19, The Royal Society of Chemistry.

Nakamura, Michihiro, et al., "Size-Controlled, One-Pot Synthesis, Characterization, and Biological Applications of Epoxy-Organosilica Particles Possessing Positive Zeta Potential", Langmuir, (2008), pp. 12228-12234, vol. 24, No. 21, American Chemical Society.

Lu, Zhenda, et al., "Formation Mechanism and Size Control in One-Pot Synthesis of Mercapto-Silica Colloidal Spheres", Langmuir, (2011), pp. 3372-3380, vol. 27, American Chemical Society.

Peng, Z. Adam, et al., "Nearly Monodisperse and Shape-Controlled CdSe Nanocrystals via Alternative Routes: Nucleation and Growth", J. Am. Chem. Soc., (2002), pp. 3343 -3353, vol. 124, American Chemical Society.

Joo, Jin, et al., "Multigram Scale Synthesis and Characterization of Monodisperse Tetragonal Zirconia Nanocrystals", J. Am. Chem. Soc., (2003), pp. 6553-6557, vol. 125, American Chemical Society.

Li, Zhengquan, et al., "Multicolor Core/Shell-Structured Upconversion Fluorescent Nanoparticles**", Adv. Mater., (2008), pp. 4765-4769, vol. 20, Wiley-VCH Verlag GmbH & Co. KGaA, Weinheim.

Park, Jongnam, et al., "Monodisperse Nanoparticles of Ni and NiO: Synthesis, Characterization, Self-Assembled Superlattices, and Catalytic Applications in the Suzuki Coupling Reaction**" Adv. Mater., Feb. 23, 2005, vol. 17, No. 4, Wiley-VCH Verlag GmbH & Co. KGaA, Weinheim.

Wang, Yan, et al., "One-Pot Synthesis and Optical Property of Copper(I) Sulfide Nanodisks", Inorganic Chemistry, (2010), pp. 6601-6608, vol. 49, No. 14, American Chemical Society.

Trentler, Timothy J., et al., "Synthesis of TiO2 Nanocrystals by Nonhydrolytic Solution-Based Reactions", J. Am. Chem. Soc., (1999), pp. 1613-1614, vol. 121, No. 7, American Chemical Society.

Joo, Jin, et al., "Large-Scale Synthesis of TiO2 Nanorods via Nonhydrolytic Sol-Gel Ester Elimination Reaction and Their Application to Photocatalytic Inactivation of *E. coli*", J. Phys. Chem. B, (2005), pp. 15297-15302, vol. 109, No. 32, American Chemical Society.

Carion, Olivier, et al., "Synthesis, encapsulation, purification and coupling of single quantum dots in phospholipid micelles for their use in cellular and in vivo imaging", Nature Protocols, (2007), vol. 2, No. 10, Nature Publishing Group.

Piao, Yuanzhe, et al., "Designed Fabrication of Silica-Based Nanostructured Particle Systems for Nanomedicine Applications**", Adv. Funct. Mater., (2008), pp. 3745-3758, vol. 18, Wiley-VCH Verlag GmbH & Co. KGaA, Neinheim.

Stöber, Werner, et al., "Controlled Growth of Monodisperse Silica Spheres in the Micron Size Range", Journal of Colloid and Interface Science, (1968), pp. 62-69, No. 26.

Gorelikov, Ivan, et al., "Single-Step Coating of Mesoporous Silica on Cetyltrimethyl Ammonium Bromide-Capped Nanoparticles", Nano Letters, (2008), pp. 369-373, vol. 8, No. 1, American Chemical Society.

Caregnato, Paula, et al., "Chemisorbed Thiols on Silica Particles: Characterization of Reactive Sulfur Species", J. Phys. Chem. C, (2010), pp. 5080-5087, vol. 114, No. 11, American Chemical Society.

Yin, Yadong, et al., "Silver Nanowires Can Be Directly Coated with Amorphous Silica to Generate Well-Controlled Coaxial Nanocables of Silver/Silica", Nano Letters, (2002), pp. 427-430, vol. 2, No. 4, American Chemical Society.

Jun, Young-wook, et al., "Chemical Design of Nanoparticle Probes for High-Performance Magnetic Resonance Imaging", Angew. Chem. Int. Ed., (2008), pp. 5122-5135, vol. 47, Wiley-VCH Verlag GmbH & Co. KGaA, Weinheim.

Kim, Jason S., et al., "Self-Assembled Hybrid Nanoparticles for Cancer-Specific Multimodal Imaging", J. Am. Chem. Soc., (2007), pp. 8962-8963, vol. 129, American Chemical Society.

Salgueiriño-Maceira, Verónica, et al., "Increasing the Complexity of Magnetic Core/Shell Structured Nanocomposites for Biological Applications**", Adv. Mater, (2007), pp. 4131-4144, vol. 19, Wiley-VCH Verlag GmbH & Co. KGaA, Weinheim.

Suh, Won Hyuk, et al., "Multifunctional nanosystems at the interface of physical and life sciences", Nano Today, (2009), pp. 27-36, vol. 4, Elsevier Ltd.

Liong, Monty, et al., "Multifunctional Inorganic Nanoparticles for Imaging, Targeting, and Drug Delivery", ACS NANO, (2008), pp. 889-896, vol. 2, No. 5, American Chemical Society.

Sathe, Tushar R., et al., "Mesoporous Silica Beads Embedded with Semiconductor Quantum Dots and Iron Oxide Nanocrystals: Dual-Function Microcarriers for Optical Encoding and Magnetic Separation", Analytical Chemistry, Aug. 15, 2006, pp. 5627-5632, vol. 78, No. 16, American Chemical Society.

Koole, Rolf, et al., "Magnetic quantum dots for multimodal imaging", WIREs Nanomedicine and Nanobiotechnology, Sep./Oct. 2009, pp. 475-491, vol. 1, John Wiley & Sons, Inc.

Selvan, S. Tamil, et al., "Synthesis of Silica-Coated Semiconductor and Magnetic Quantum Dots and Their Use in the Imaging of Live Cells**", Angew. Chem. Int. Ed., 2007, pp. 2448-2452, vol. 46, Wiley-VCH Verlag GmbH & Co. KGaA, Weinheim.

Kim, Jaeyun, et al., "Magnetic Fluorescent Delivery Vehicle Using Uniform Mesoporous Silica Spheres Embedded with Monodisperse Magnetic and Semiconductor Nanocrystals", J. Am. Chem. Soc., (2006), pp. 688-689, vol. 128, American Chemical Society.

(56) References Cited

OTHER PUBLICATIONS

Wilson, Robert et al., "A Simple Method for Preparing Spectrally Encoded Magnetic Beads for Multiplexed Detection", ACS NANO, (2007), pp. 487-493, vol. 1, No. 5, American Chemical Society.

Kim, Jaeyun, et al., "Designed Fabrication of Multifunctional Magnetic Gold Nanoshells and Their Application to Magnetic Resonance Imaging and Photothermal Therapy**", Angew. Chem. Int. Ed., (2006), pp. 7754-7758, vol. 45, Wiley-VCH Verlag GmbH & Co. KGaA, Weinheim.

Spasova, Marina, et al., "Magnetic and optical tunable microspheres with a magnetite/gold nanoparticle shell", Journal of Materials Chemistry, (2005), pp. 2095-2098, vol. 15, The Royal Society of Chemistry.

Shylesh, Sankaranarayanapillai, et al., "Magnetically Separable Nanocatalysts: Bridges between Homogeneous and Heterogeneous Catalysis", Angew. Chem. Int. Ed., (2010), pp. 3428-3459, vol. 49, Wiley-VCH Verlag GmbH & Co. KGaA, Weinheim.

Ge, Jianping, et al., "Core-Satellite Nanocomposite Catalysts Protected by a Porous Silica Shell: Controllable Reactivity, High Stability, and Magnetic Recyclability**", Angew. Chem. Int. Ed., (2008), pp. 8924-8928, vol. 47, Wiley-VCH Verlag GmbH & Co. KGaA, Weinheim.

Xuan, Shouhu, et al., "Preparation, Characterization, and Catalytic Activity of Core/Shell $Fe_3O_4$@Polyaniline@Au Nanocomposites", Langmuir, (2009), pp. 11835-11843, vol. 25, No. 19, American Chemical Society.

Lee, Kyung Sig, et al., "Synthesis of hybrid $Fe_3O_4$-silica-NiO superstructures and their application as magnetically separable high-performance biocatalysts", Chem. Commun., (2009), pp. 3780-3782, The Royal Society of Chemistry.

Kotov, Nicholas A., et al., "Layer-by-Layer Self-Assembly of Polyelectrolyte-Semiconductor Nanoparticle Composite Films", J. Phys. Chem, (1995), pp. 13065-13069, vol. 99, American Chemical Society.

Caruso, Frank, et al., "Magnetic Nanocomposite Particles and Hollow Spheres Constructed by a Sequential Layering Approach", Chem. Mater., (2001), pp. 109-116, vol. 13, No. 1, American Chemical Society.

Stoeva, Savka I., et al., "Three-Layer Composite Magnetic Nanoparticle Probes for DNA", J. Am. Chem. Soc., (2005), pp. 15362-15363, vol. 127, American Chemical Society.

Wang, Zheng, et al., "Multifunctional nanoparticles/silica microsphere assemblies using polyglycidyl methacrylate shells as supports", Journal of Colloid and Interface Science, (2009), pp. 83-90, vol. 339, Elsevier Inc.

Lee, Jae-Hyun, et al., "Dual-Mode Nanoparticle Probes for High-Performance Magnetic Resonanceand Fluorescence Imaging of Neuroblastoma**", Angew. Chem. Int. Ed., (2006), pp. 8160-8162, vol. 45, Wiley-VCH Verlag GmbH & Co. KGaA, Weinheim.

Wang, Chungang, et al., "Gold Nanorod/$Fe_3O_4$ Nanoparticle "Nano-Pearl-Necklaces" for Simultaneous Targeting, Dual-Mode Imaging, and Photothermal Ablation of Cancer Cells**", Angew. Chem. Int. Ed., (2009), pp. 2759-2763, vol. 48, Wiley-VCH Verlag GmbH & Co. KGaA, Weinheim.

Sun, Shouheng, et al., Monodisperse $MFe_2O_4$ (M : Fe, Co, Mn) Nanoparticles, J. Am. Chem. Soc., (2004), pp. 273-279, vol. 126, No. 1, American Chemical Society.

Yin, Yadong, et al., "Colloidal nanocrystal synthesis and the organic-inorganic interface", Nature, Sep. 29, 2005, pp. 664-670, vol. 437, Nature Publishing Group.

Murray, C. B., et al., "Synthesis and Characterization of Nearly Monodisperse CdE (E=S, Se, Te) Semiconductor Nanocrystallites", J. Am. Chem. Soc., (1993), pp. 8706-8715, vol. 115, No. 19, American Chemical Society.

Park, Jongnam, et al., "Ultra-large-scale syntheses of monodisperse nanocrystals", Nature Materials, Dec. 2004, pp. 891-895, vol. 3, Nature Publishing Group.

Talapin, Dmitri V., et al., "Highly Luminescent Monodisperse CdSe and CdSe/ZnS Nanocrystals Synthesized in a Hexadecylamine-Trioctylphosphine Oxide-Trioctylphospine Mixture", Nano Letters, (2001), pp. 207-211, vol. 1, No. 4, American Chemical Society.

Bruchez Jr., Marcel, et al., "Semiconductor Nanocrystals as Fluorescent Biological Labels", Science, Sep. 25, 1998, pp. 2013-2016 (5 Total Pages), vol. 281.

Chan, Warren C. W., et al., "Quantum Dot Bioconjugates for Ultrasensitive Nonisotopic Detection", Science, Sep. 25, 1998, pp. 2016-2018 (4 Total Pages), vol. 281.

Talapin, Dmitri V., et al., "Synthesis and surface modification of amino-stabilized CdSe, CdTe and InP nanocrystals", colloids and Surfaces A: Physicochemical and Engineering Aspects, (2002), pp. 145-154, vol. 202, Elsevier Science B.V.

Schreiber, Frank, "Structure and growth of self-assembling monolayers", Progress in Surface Science, (2000), pp. 151-256, vol. 65, Elsevier Science Ltd.

Liu, G., et al., "Adsorption of Methanethiol on Stoichiometric and Defective $TiO_2(110)$ Surfaces: A Combined Experimental and Theoretical Study", J. Phys. Chem. B, (2002), pp. 9883-9891, vol. 106.

Perkins, Craig L., "Molecular Anchors for Self-Assembled Monolayers on ZnO: A Direct Comparison of the Thiol and Phosphonic Acid Moieties", J. Phys. Chem. C, (2009), 18276-18286, vol. 113, American Chemical Society.

Sadik, Patrick W., et al., "Functionalizing Zn- and O-terminated ZnO with thiols", Journal of Applied Physics, (2007), pp. 104514-1-104514-5, vol. 101, American Institute of Physics.

Liu, Fengmin, et al., "Surface characterization study on $SnO_2$ powder modified by thiourea", Materials Chemistry and Physics, (2005), pp. 301-304, vol. 93, Elsevier B.V.

Lim, Hyuneui, et al., "Chemical and Thermal Stability of Alkanethiol and Sulfur Passivated InP(100)", Langmuir, (2004), 743-747, vol. 20, American Chemical Society.

Yamamoto, Hiromichi, et al., "Characterization of the Surface to Thiol Bonding in Self-Assembled Monolayer Films of $C_{12}H_{25}SH$ on InP(100) by Angle-Resolved X-ray Photoelectron Spectroscopy", Langmuir, (1999), pp. 8640-8644, vol. 15, American Chemical Society.

Petrovykh, Dmitri Y., et al., "Self-Assembled Monolayers of Alkanethiols on InAs", Langmuir, (2009), pp. 12185-12194, vol. 25, No. 20, American Chemical Society.

Tanzer, T. A., et al., "Near-surface electronic structure on InAs (100) modified with self-assembled monolayers of alkanethiols", Applied Physics Letters, Nov. 1, 1999, pp. 2794-2796, vol. 75, No. 18, American Institute of Physics.

Voznyy, Oleksandr, et al., "Adsorption Kinetics of Hydrogen Sulfide and Thiols on GaAs (001) Surfaces in a Vacuum", J. Phys. Chem. C, (2008), pp. 3726-3733, vol. 112, No. 10, American Chemical Society.

McGuiness, Christine L., et al., "Molecular Self-Assembly at BareSemiconductor Surfaces: Cooperative Substrate—Molecule Effects in Octadecanethiolate Monolayer Assemblies on GaAs(111), (110), and (100)", ACS NANO, (2010), pp. 3447-3465, vol. 4, No. 6, American Chemical Society.

Goh, S. W., et al., "XPS, Static SIMS and NEXAFS Spectroscopic Investigation of Thiol Adsorption on Metals and Metal Sulfides", ECS Transactions, (2006), pp. 107-119, vol. 2, No. 3, The Electrochemical Society.

Hu, Kai, et al., "Characterization and Surface Charge Measurement of Self-Assembled CdS Nanoparticle Films", Chem. Mater., (1998), pp. 1160-1165, vol. 10, No. 4, American Chemical Society.

Colvin, V. L., et al., "Semiconductor Nanocrystals Covalently Bound to Metal Surfaces with Self-Assembled Monolayers", J. Am. Chem. Soc., (1992), pp. 5221-5230, vol. 114, No. 13, American Chemical Society.

Mann, Jonathan R., et al., "Adsorption of CdSe Nanoparticles to Thiolated $TiO_2$ Surfaces: Influence of Intralayer Disulfide Formation on CdSe Surface Coverage", Langmuir, (2007), pp. 10924-10928, vol. 23, No. 22, American Chemical Society.

Lee, Yuh-Lang, et al., "Highly Efficient CdSe-Sensitized $TiO_2$ Photoelectrode for Quantum-Dot-Sensitized Solar Cell Applications", Chem. Mater., pp. 6903-6905, vol. 20, No. 22, American Chemical Society.

(56) References Cited

OTHER PUBLICATIONS

Nakamura, Tadashi, et al., "Direct synthesis of monodispersed thiol-functionalized nanoporous silica spheres and their application to a colloidal crystal embedded with gold nanoparticles", Journal of Materials Chemistry, (2007), pp. 3726-3732, vol. 17, The Royal Society of Chemistry.

Westcott, Sarah L., et al., "Formation and Adsorption of Clusters of Gold Nanoparticles onto Functionalized Silica Nanoparticle Surfaces", Langmuir, (1998), pp. 5396-5401, vol. 14, No. 19, American Chemical Society.

Claesson, E. M., et al., "Monodisperse Magnetizable Composite Silica Spheres with Tunable Dipolar Interactions", Langmuir, (2005), pp. 9412-9419, vol. 21, No. 21, American Chemical Society.

Claesson, Maria E., et al., "Thiol-functionalized silica colloids, grains, and membranes for irreversible adsorption of metal(oxide) nanoparticles", Colloids and Surfaces A: Physicochem. Eng. Aspects, (2007), pp. 46-54, vol. 297, Elsevier B.V.

* cited by examiner

DIRECT ASSEMBLY OF HYDROPHOBIC NANOPARTICLES TO MULTIFUNCTION STRUCTURES

FEDERALLY SPONSORED RESEARCH OR DEVELOPMENT

This invention was made with government support under Grant No. DMR0956081 awarded by the National Science Foundation (NSF). The government has certain rights in this invention.

FIELD OF THE INVENTION

The invention relates to a method of producing multifunctional composite particles by direct self-assembly of hydrophobic nanoparticles on host nanostructures containing high density surface thiol groups, and the use of thiol-terminated colloidal organosilica (mercapto-silica) particles to directly immobilize hydrophobic ligand capped nanoparticles.

BACKGROUND

Multifunctional particles in the micrometer or sub-micrometer scale that exhibit two or more different properties are highly desirable for many important technological applications, ranging from catalysis to energy harvesting and transformation, multimodal imaging, detection, and simultaneous diagnosis and therapy. For example, microspheres embedded with magnetic iron oxide nanoparticles and fluorescent quantum dots have been widely studied as a multiple-mode imaging contrast agents combining magnetic resonance with optical detection and biological targeting. By carefully controlling the loading of quantum dots (QD), the obtained composite particles possess a dual function of optical encoding and magnetic separation. Replacing quantum dots with noble metal nanoparticles in such composites results in new types of multifunctional structures that are capable of magnetic resonance imaging and photothermal therapy. Magnetic materials have also been combined with nanocatalysts to form magnetically separable catalysts for the recovery and reuse of expensive catalysts after catalytic reactions, thus bridging the gap between heterogeneous and homogeneous catalysis.

Nanoparticle assembly represents a powerful approach that has been actively explored recently for producing bi-, tri-, and multifunctional materials in contrast to their limited single-component counterparts. By organizing different types of nanoparticles together, it not only allows the utilization of the size- and shape-dependent properties of individual nanoparticles, but also takes advantage of new properties resulting from the interactions between neighbors. Conventional assembly processes for multifunctional structures such as the well-known layer-by-layer (LbL) methods are mostly limited to hydrophilic nanoparticle systems because they heavily rely on electrostatic interactions. The direct linking nanoparticles through chemical bonds between surface ligands has also been attempted, but is limited to some special cases because most commonly used protecting ligands of nanoparticles do not contain additional active functional groups that allow further reactions.

Many technologically important high quality nanoparticles, especially semiconductors (such as CdSe, ZnSe, CdTe, and InP, InAs) and metal oxides (such as $\gamma$-$Fe_2O_3$, MnO, $TiO_2$, $ZrO_2$, $CoFe_2O_4$) are predominantly prepared through thermolytic routes by reacting inorganic precursors in organic solvents at high temperatures (preferably 150° C.-320° C.). The resulting nanostructures, however, retain the hydrophobic character of the organic ligands and, hence, are not soluble in water. As a result, it has been very difficult to assemble them directly into multifunctional nanostructures using means similar to those for water soluble particles. Typically, it is necessary to impose hydrophilic character on the nanoparticle surface and ensure water dispersibility (also biocompatibility) by replacing the hydrophobic organic ligands with hydrophilic ones. However, ligand exchange processes usually involve several extra steps and in many cases are detrimental to the physical properties of the nanoparticles because the new hydrophilic ligands may not be able to effectively insulate the inorganic cores from the aqueous environment. For example, ligand exchange of hydrophobic trioctylphosphine oxide (TOPO) on the surface of CdSe/ZnS quantum dots (QDs) with various hydrophilic ligands causes a significant decrease in quantum efficiencies. Furthermore, the new ligands tend to desorb gradually from the nanoparticles, leading to aggregation and precipitation of the nanoparticles. More importantly, if more than one type of nanoparticles is needed for achieving multiple functions, each must be surface-treated separately before assembly. Therefore, it is highly desirable to develop a simple and general approach that allows the fabrication of multifunctional nanostructures by direct assembly of hydrophobic nanoparticles of various compositions. As their major applications are in the biomedical fields, it is also highly desired that these multifunctional systems be dispersible in water.

SUMMARY

In accordance with an exemplary embodiment, a method of production of multifunctional colloidal structures by direct self-assembly of nanoparticles on host nanostructures.

In accordance with another exemplary embodiment, use of thiol-terminated colloidal organosilica (mercapto-silica) particles to directly immobilize hydrophobic ligand capped nanoparticles.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention. In the drawings.

DETAILED DESCRIPTION

Figure 1:
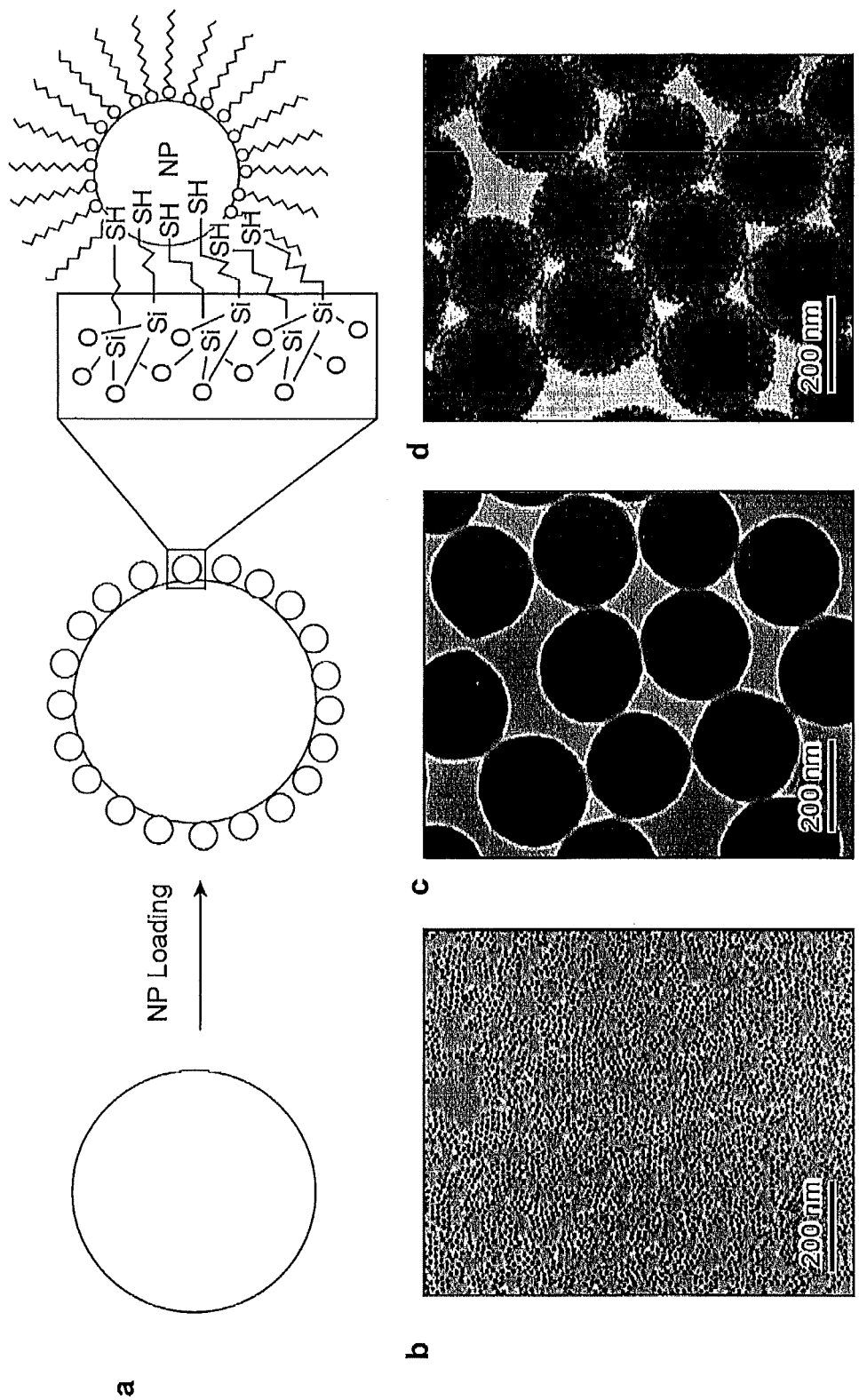
FIG. 1 shows (a) schematic illustration showing the procedure of self-assembly of hydrophobic nanoparticles on MPS ((3-mercaptopropyl)trimethoxysilane spheres), (b) TEM images of oleic acid capped $\gamma$-$Fe_2O_3$ nanoparticles, and (c) MPS spheres, and (d) $\gamma$-$Fe_2O_3$ nanoparticles assembled on the surface of MPS spheres.

In accordance with an exemplary embodiment, a general process that allows convenient production of multifunctional composite particles by direct self-assembly of hydrophobic nanoparticles on host nanostructures containing high density surface thiol groups is described. Hydrophobic nanoparticles of various compositions and combinations can be directly assembled onto the host surface through the strong coordination interactions between metal cations and thiol groups.

In accordance with an exemplary embodiment, the resulting structures can be further conveniently overcoated with a layer of normal silica to stabilize the assemblies and render them highly dispersible in water for biomedical applications.

As the entire fabrication process does not involve complicated surface modification procedures, the hydrophobic ligands on the nanoparticles are not disturbed significantly so that they retain their original properties such as highly efficient luminescence. Many complex composite nanostructures with tailored functions can be efficiently produced by using this versatile approach. For example, multifunctional nonspherical nanostructures can be efficiently produced by using mercapto-silica coated nano-objects of arbitrary shapes as hosts for immobilizing functional nanoparticles. Multilayer structures can also be achieved by repeating the mercapto-silica coating and nanoparticle immobilization processes. Such assembly approach will provide the research community a highly versatile, configurable, scalable, and reproducible process for the preparation of various multifunctional structures.

The strong coordinating interactions between alkanethiols and metal surfaces have been extensively studied and utilized in the formation of self-assembled monolayers (SAMs) on metal surfaces. It has also been reported that alkanethiols can adsorb onto metal oxide surfaces (such as $TiO_2$, ZnO, and $SnO_2$) and semiconductor substrates (such as InP, InAs, and GaAs, and metal sulfides). Recently, the thiol-metal interaction has been used to immobilize nanoparticles on alkanethiol-modified solid substrates, and has been further extended to the colloidal substrates by assembling Au nanoparticles to thiol-functionalized silica colloids. For example, Philipse et al. have explored the attachment of magnetic particles to colloidal silica that was grafted with (3-mercaptopropyl)trimethoxysilane (MPS). Their efforts, however, have been still limited to only water soluble $\gamma$-$Fe_2O_3$ and $CoFe_2O_4$ nanoparticles, probably due to the low density of thiol groups achievable during the surface modification of colloidal silica. In addition, prior studies have shown that colloidal silica with a high surface loading of thiol groups can effectively harvest hydrophobic Au nanocrystals from nonpolar solutions.

In accordance with an exemplary embodiment, the use of thiol-terminated colloidal organosilica (mercapto-silica) particles to directly immobilize various types of hydrophobic ligand capped nanoparticles, and further develop a general and powerful self-assembly method for the fabrication of multifunctional composite nanostructures is explored. Briefly, mercapto-silica colloidal particles made from MPS are first synthesized as adsorbent hosts, named as MPS spheres. Nanoparticles of desired functions are synthesized separately using well-established thermolysis methods, and then efficiently immobilized on the surface of MPS spheres by taking advantage of the high density thiol groups. In order to improve the chemical/mechanical stability and water-dispersibility, the composites can be further coated with a thin shell of normal silica. After demonstrating this simple assembly process, the procedure is generalized by immobilizing nanoparticles on mercapto-silica modified nanoscale objects, thus opening the door to the fabrication of more complex multifunctional composite structures.

FIG. 1a outlines the general self-assembly strategy for the fabrication of monodisperse, well-defined nanoparticle-silica multifunctional composites. The assembly involves two essential building blocks: mercapto-silica spheres and hydrophobic ligand-capped nanoparticles. In an exemplary process, a MPS precursor is hydrolyzed rapidly in an ammonia solution to yield spherical colloids. These mercapto-silica spheres are both structurally and functionally different from normal silica particles prepared from alkoxide precursors such as tetraethyl orthosilicate (TEOS). The use of MPS grants the resulting spheres a layer of high density surface thiol groups, which are expected to tether a dense layer of nanoparticles through the strong thiol-metal interactions. On the other hand, the abundant mercaptopropyl groups make the MPS spheres dispersible in nonpolar solvents such as toluene, facilitating the approaching of mercapto-silica and hydrophobic nanocrystals during the assembly process. The narrowly distributed MPS spheres with controlled sizes ranging from approximately 150 nm to approximately 3.5 micrometers can be produced by simply changing the reaction conditions, for example, the amount of the silane precursor, making it possible to produce uniform multifunctional nanocomposites with the desired dimensions. Hydrophobic ligand-capped nanoparticles are prepared through standard high-temperature thermolysis reaction. FIGS. 1b and 1c show transmission electron microscopy (TEM) images of oleic acid-capped $\gamma$-$Fe_2O_3$ nanoparticles (diameter: 12±0.7 nm) and MPS spheres (diameter: 280±30 nm).

Nanoparticles are assembled on the surface of MPS spheres by simply mixing them in nonpolar solvents such as toluene and cyclohexane. Generally, excess nanoparticles are used to ensure the dense coverage on the MPS spheres. Nanoparticle-capped MPS spheres are collected after washing several times with nonpolar solvent to remove free nanoparticles. As shown in FIG. 1d, a monolayer of $\gamma$-$Fe_2O_3$ nanoparticles can be clearly observed on the originally smooth surface of MPS spheres. No free nanoparticles can be observed, suggesting a strong attraction between the nanoparticles and MPS spheres. In accordance with an exemplary embodiment, during the assembly process, the thiol groups can partially replace the original surface ligands (oleic acid) and coordinate to the metal sites on the nanoparticle surface.

Figure 2:
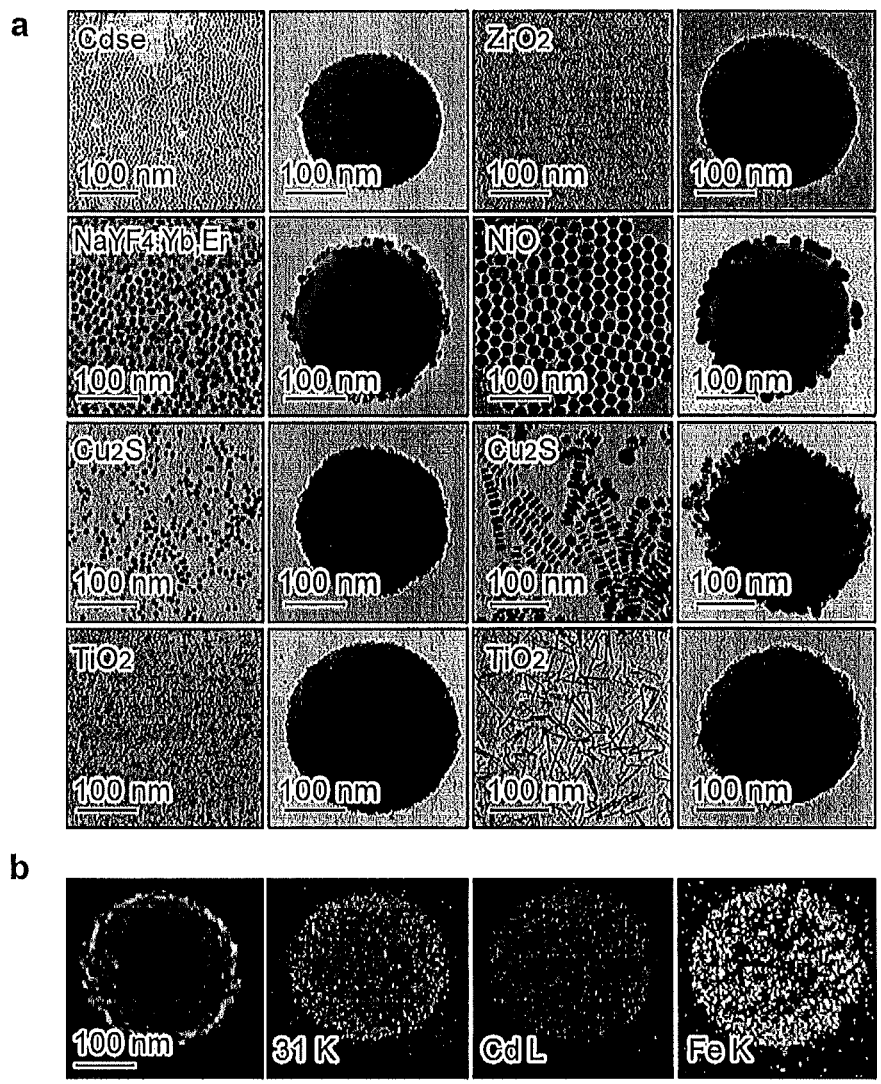
FIG. 2 shows (a) TEM images of various hydrophobic nanoparticles assembled on the surface of MPS spheres: left columns (column 1 and 3) show the different nanoparticles and right columns (column 2 and 4) represent the corresponding nanoparticle-capped MPS spheres, and wherein the $ZrO_2$, $TiO_2$ nanodots are originally protected by TOPO, $NaYF_4$:Yb, Er, $TiO_2$ nanorods by oleic acid, CdSe and NiO by TOPO and oleylamine, and both small and large $Cu_2S$ nanodisks by 1-dodecanethiol, and (b) SEM image and the corresponding EDX mapping of the elemental distribution of Si, Cd and Fe in a composite sphere of MPS@$\gamma$-$Fe_2O_3$&CdSe.

Thiols form stable bonds with most metal cations except alkali and alkaline earth ions. To test the versatility of the assembly process, various hydrophobic metal compound nanoparticles including trioctylphosphine oxide (TOPO) and oleylamine capped CdSe, TOPO capped $ZrO_2$, oleic acid capped NaYF4:Yb,Er, TOPO and oleylamine capped NiO, 1-dodecanethiol capped $Cu_2S$ discs, TOPO capped $TiO_2$ dots and oleic acid capped rods were assembled on the surface of the MPS spheres, as shown in FIG. 2a. A layer of nanoparticles can be easily identified on the surface of each MPS sphere, indicating the generality of the assembly strategy for hydrophobic metal compound nanoparticles. Note that $Cu_2S$ discs with different diameters (8 nm and 20 nm) show a similar high affinity for the MPS spheres, indicating a minimal size effect on the binding process. This has been also confirmed by the dense coverage of $\gamma$-$Fe_2O_3$ nanoparticles of 5 nm, 12 nm and 20 nm on MPS spheres. The similar adsorption behavior of $TiO_2$ nanodots and nanorods on MPS spheres also suggests that the shape of nanoparticles has no significant effect on assembly efficiency.

The simple assembly process allows great flexibility in incorporating multiple nanoparticle components. A competition for immobilization on the surface of MPS spheres would appear among various types of nanoparticles due to their different affinity to thiol groups, which generally follows the Hard Soft Acid Base (HSAB) theory. Nanoparticles containing soft-acid cations such as Pt(II), Cu(I), Cd(II) and Au(I) bind to thiol groups much more strongly compared with those made of hard-acid cations such as Fe(III) and Ti(IV). In a nanoparticle mixture, it is necessary to increase the relative concentration of those with low-affinity to ensure sufficient loading. As an example shown in FIG. 2b, the assembly of $\gamma$-$Fe_2O_3$ nanoparticles and CdSe QDs on MPS spheres is demonstrated by mixing their dispersions at a particle number ratio of 10:1. The simultaneous capture of nanoparticles of $\gamma$-$Fe_2O_3$ and QD on the MPS surfaces has been confirmed by using scanning electron microscopy (SEM) imaging and energy dispersive X-ray (EDX) elemental mapping of a typical composite sphere. The strong Si signal across the sphere confirms the organosilica core, while the Fe and Cd signals both detected in the surface region clearly suggests the co-adsorption of these two types of particles.

Figure 3:
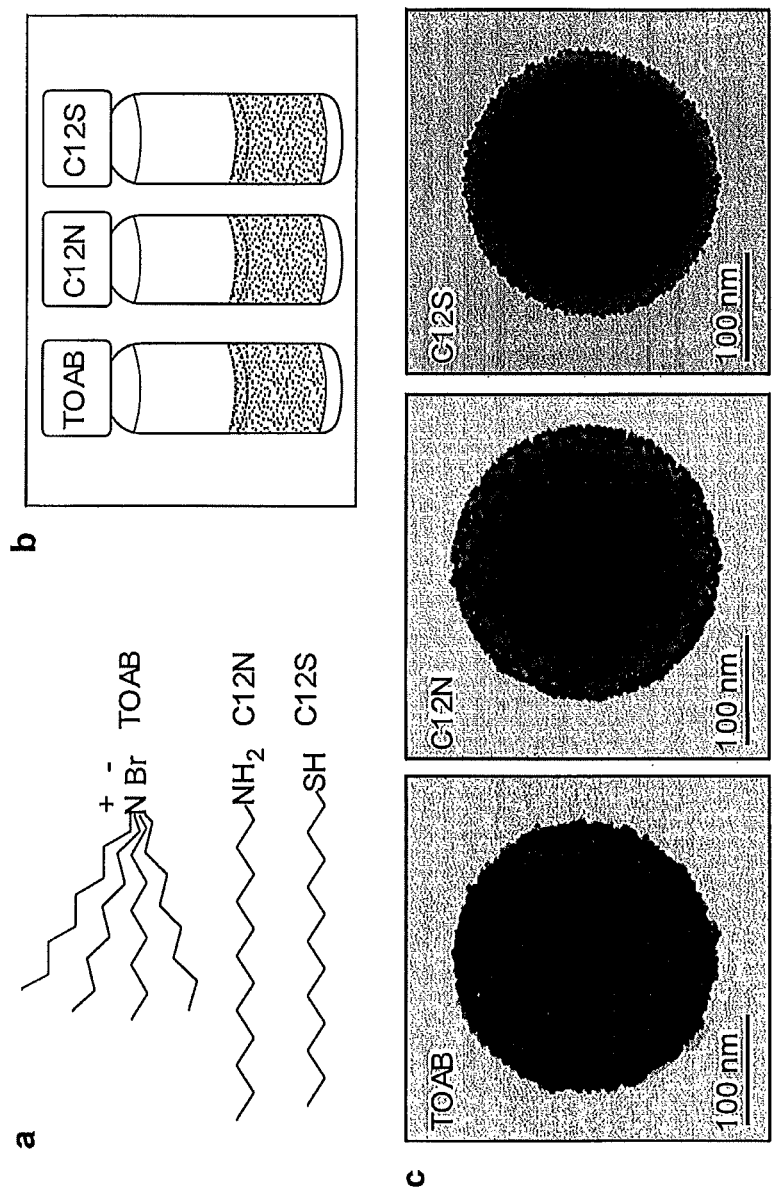
FIG. 3 shows the effect of original capping ligands on nanoparticle assembly, wherein (a) is the molecular structures of the three protection ligands capped on Au nanoparticles (TOAB, Cl2N and Cl2S), (b) digital photo of toluene dispersion of MPS spheres loaded with Au nanoparticles whose surfaces are capped with the three different protection ligands, and (c) TEM images of the corresponding MPS spheres in photo b.

In order to reach the metal sites on the nanoparticle surface, the thiol groups of MPS spheres may partially replace the original capping ligands on the nanoparticle surface. To evaluate this ligand replacement, hydrophobic Au nanoparticles capped with three different protection ligands, tetraoctylammonium bromide (TOAB), dodecylamine (C12N) and 1-dodecanethiol (C12S) are used for assembly. The molecular structures of these ligands are shown in FIG. 3a. After mixing with Au nanoparticles in toluene for approximately 20 minutes, the MPS spheres were separated from the mixture and washed a few times to remove free Au nanoparticles. FIG. 3b presents the digital photos of toluene dispersions of Au nanoparticle-immobilized MPS spheres, with TOAB, C12N, and C12S capped spheres exhibiting blue, purple, and light red colors, respectively. The shift of the surface plasmon resonance bands (color change) is the result of interparticle electromagnetic coupling: MPS spheres attract more TOAB capped Au nanoparticles, resulting in smaller interparticle distance and consequently a larger blue shift. The color intensity also indicates the loading of nanoparticles on MPS spheres. Due to the stability order of bonding Au—TOAB<Au—C12N<Au—C12S, the weaker capping ligands are detach easily from the Au surface to allow for the formation of Au—S bonds, leading to higher nanoparticle loading, as confirmed in FIG. 3c. The interesting fact that some C12S capped Au nanoparticles can still be captured by MPS spheres indicates that the thiol groups on MPS spheres can still replace some of the original alkanethiols to form new Au—S bonds even though the new bonds are similar to the original bonds in strength, which is consistent with the dynamic nature of the ligand adsorption on nanoparticle surface. As ligand replacement will eventually reach dynamic equilibrium, it can be predicted that nanoparticle immobilization can always occur even if the new thiol-nanoparticle bond is weak compared to the original ligand-nanoparticle interaction, but the actual loading may be significantly affected by the relative bond strength.

Figure 4:
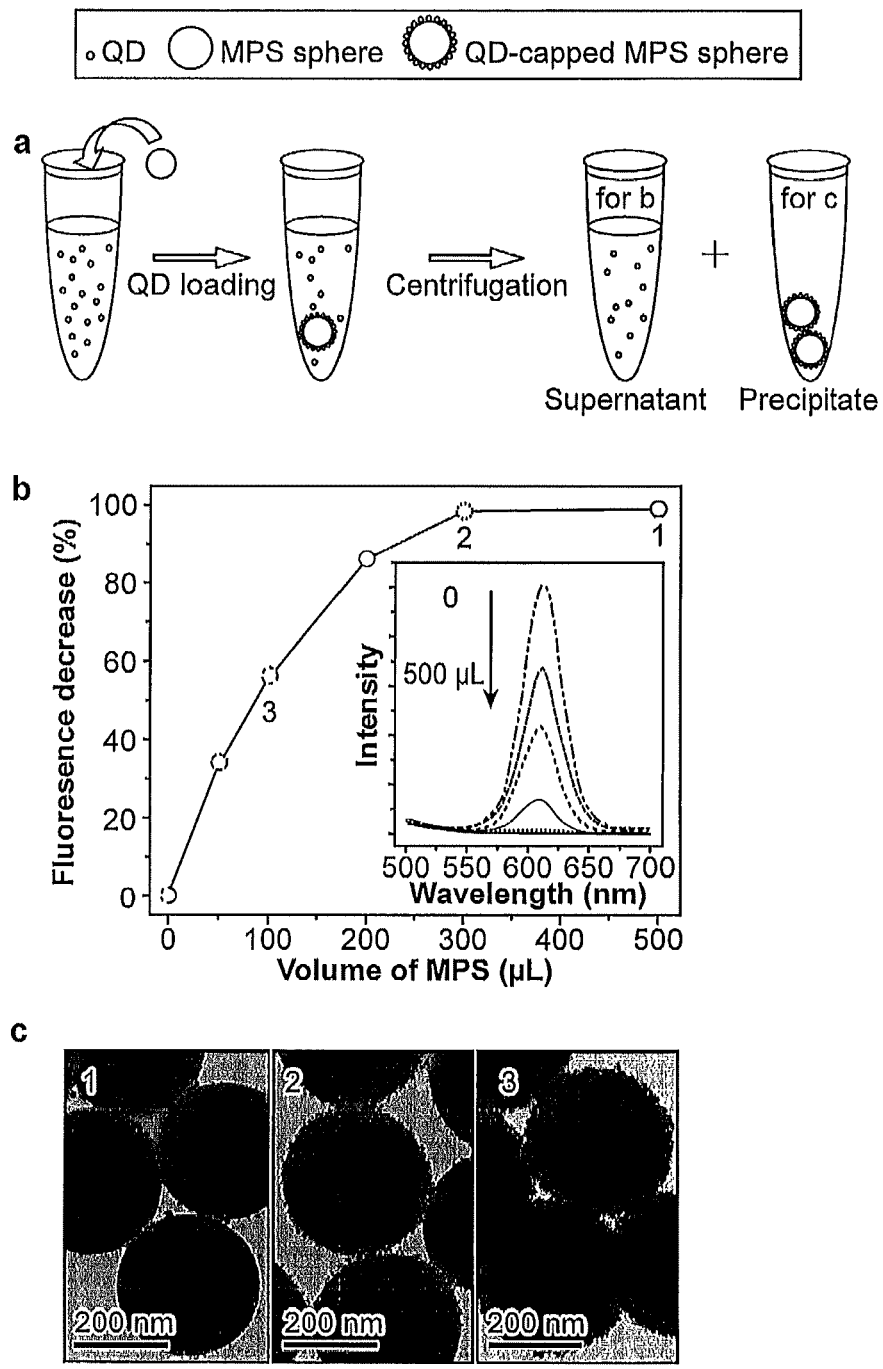
FIG. 4 shows (a) a schematic diagram of the self-assembly of CdSe@CdZnS QDs on MPS spheres, showing how the PL spectra in (b) and TEM images in (c) were recorded, the original surface of QDs was covered by oleic acid, (b) PL spectra of the supernatant after adsorbtion of QDs by different amount of MPS spheres, and (c) TEM images of the precipitates (QD-capped MPS spheres) corresponding to the three points highlighted with numbers 1, 2 and 3 in FIG. b.

In accordance with an exemplary embodiment, the loading density of nanoparticles on the MPS spheres is related to their number ratio during assembly. If one assumes that the nanoparticles on the MPS spheres arrange in a hexagonal close-packing structure, the number of nanoparticles per MPS sphere, N, can be estimated by $N=4\alpha(1+R/r)^2$, where $\alpha=0.906$ is the density of the circular hexagonal arrangement, and R and r are the radii of MPS spheres and nanoparticles, respectively. This equation allows one to estimate the amount of nanoparticles that is needed for a required loading density, for example, one MPS sphere with diameter of 300 nm can immobilize approximately $5\times10^3$ 8-nm nanoparticles. Experimentally, one can quantify the nanoparticle loading by measuring their optical absorption or photoluminescence (PL), as shown in FIG. 4a by using CdSe/CdZnS QDs as an example. QDs approximately 8 nm in diameter in a toluene solution (500 μL, approximately $10^{14}$ particles per mL) were mixed with different amounts of MPS sphere solution (approximately $2\times10^{10}$ spheres per mL) for 1 hour under vigorous shaking, followed by centrifugation at 11000 rpm for 10 min (free QDs remain in supernatant at this speed). Supernatant was collected for fluorescence measurement to monitor the amount of the free QDs left in the solution, and the precipitates were harvested for qualitative analysis of QD loading using TEM. As shown in FIG. 4b, the fluorescence intensity of the supernatant decreased as more MPS solution was added to the system. When only a small amount of MPS solution (<100 μL) was added, QDs remained in excess so that the decrease in fluorescence was nearly proportional to the added amount of MPS solution. The corresponding TEM image (FIG. 4c) confirms that the surface of every MPS sphere is fully occupied by QDs. Adding more MPS spheres (200 μL and 300 μL) led to a decrease in fluorescence intensity because more QDs were captured by MPS spheres and then removed from the supernatant. No free QDs were left in the supernatant when 300 μL of MPS spheres was added. At this stage there are not enough QDs to cover all the MPS surfaces in the form of a close-packed monolayer, as indicated in the TEM image in FIG. 4c. When 500 μL of MPS solution was added, even fewer QDs were adsorbed on each MPS sphere. If one assumes that 200 μL of MPS solution is the amount needed for a close-packed monolayer of QDs, each MPS sphere can capture $10^4$ QDs as estimated from the concentration and volume of MPS spheres and QDs that are used. This value is consistent with the result calculated based on geometric considerations ($5\times10^3$).

The adsorption of hydrophobic nanoparticles onto MPS spheres results in composite particles that are non-dispersible in water, thus preventing their direct application in environmental and biomedical applications. This limitation can be conveniently addressed by overcoating the composite particles with an additional layer of normal silica. Silica coating can endow the composites with biocompatibility and the possibility of subsequent functionalization. The additional advantages of using silica as a coating material mainly lie in its chemical stability, easy regulation of the coating process, controllable porosity, processability, and optical transparency.

Figure 5:
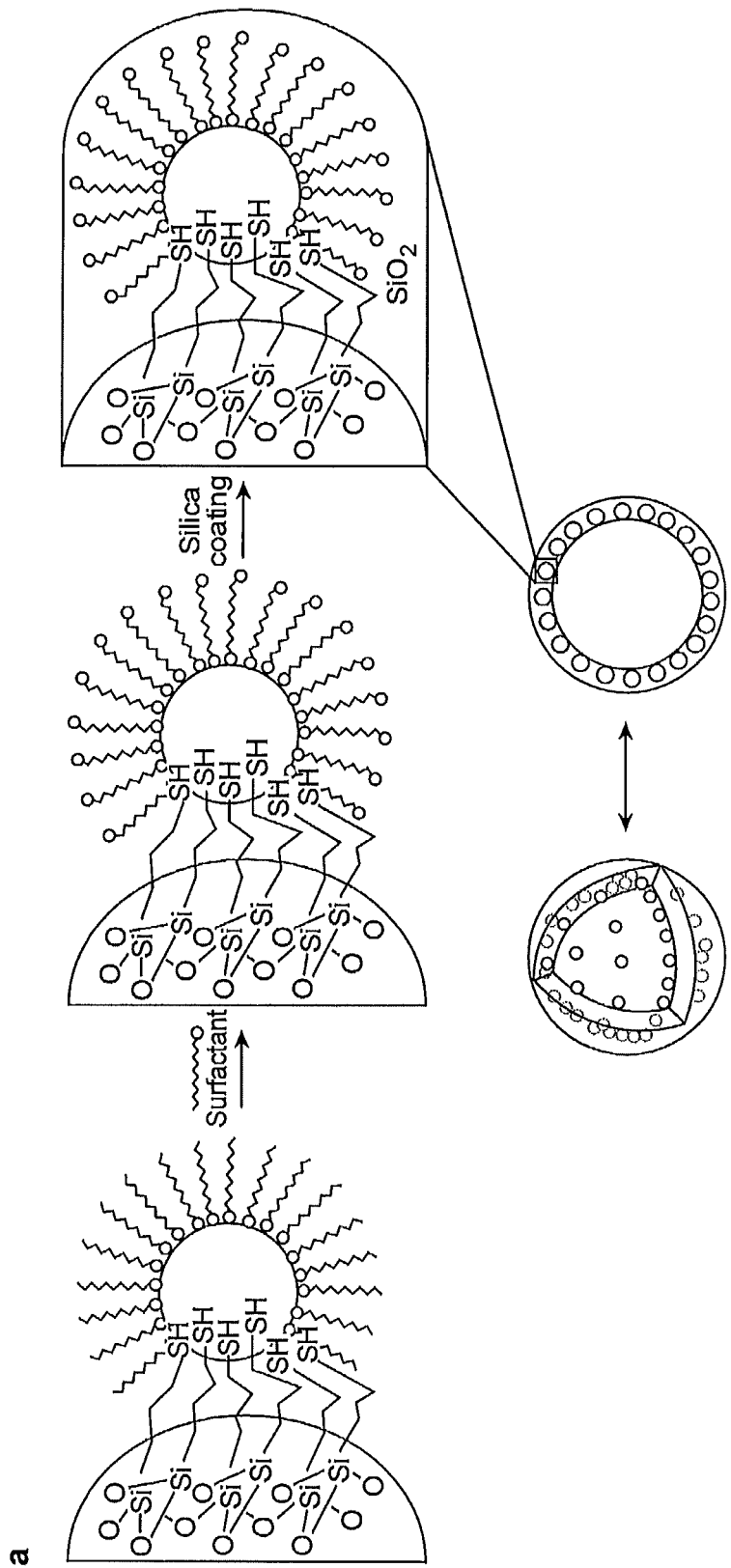
FIG. 5 shows (a) a schematic illustration showing the approach for transferring nanoparticle-capped MPS spheres from oil to water phase by forming bilayer structure and subsequent silica coating, (b) TEM images of low and high magnification of silica coated $\gamma$-$Fe_2O_3$ nanoparticle-capped MPS spheres (MPS@$\gamma$-$Fe_2O_3$@$SiO_2$) synthesized in the presence of SDS, and wherein the $\gamma$-$Fe_2O_3$ nanoparticles were originally protected by oleic acid, and (c) TEM images of MPS spheres capped with various nanoparticles and then surface coated with silica in the presence of SDS surfactant: (1) MPS@Au@$SiO_2$, (2) MPS@$TiO_2$ nanorods@$SiO_2$, and (3) MPS@$ZrO_2$@$SiO_2$, and wherein the Au nanoparticles were originally proteced by dodecylamine (Cl2N), $TiO_2$ nanorods by oleic acid, and $ZrO_2$ nanodots by TOPO.
Figure 5:
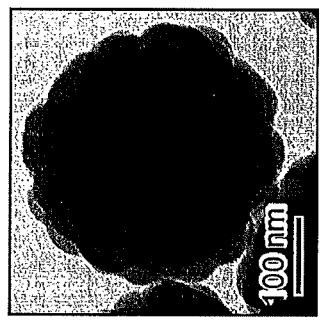
Figure 5:
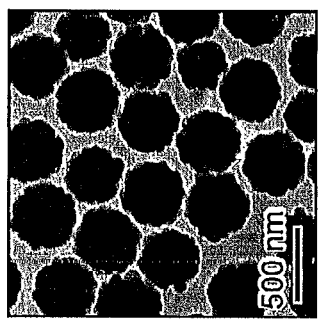
Figure 5:
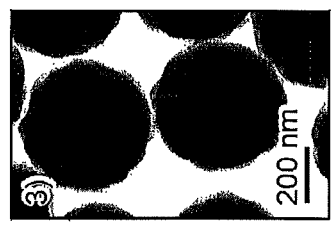
Figure 5:
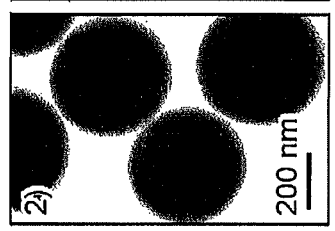
Figure 5:
Figure 6:
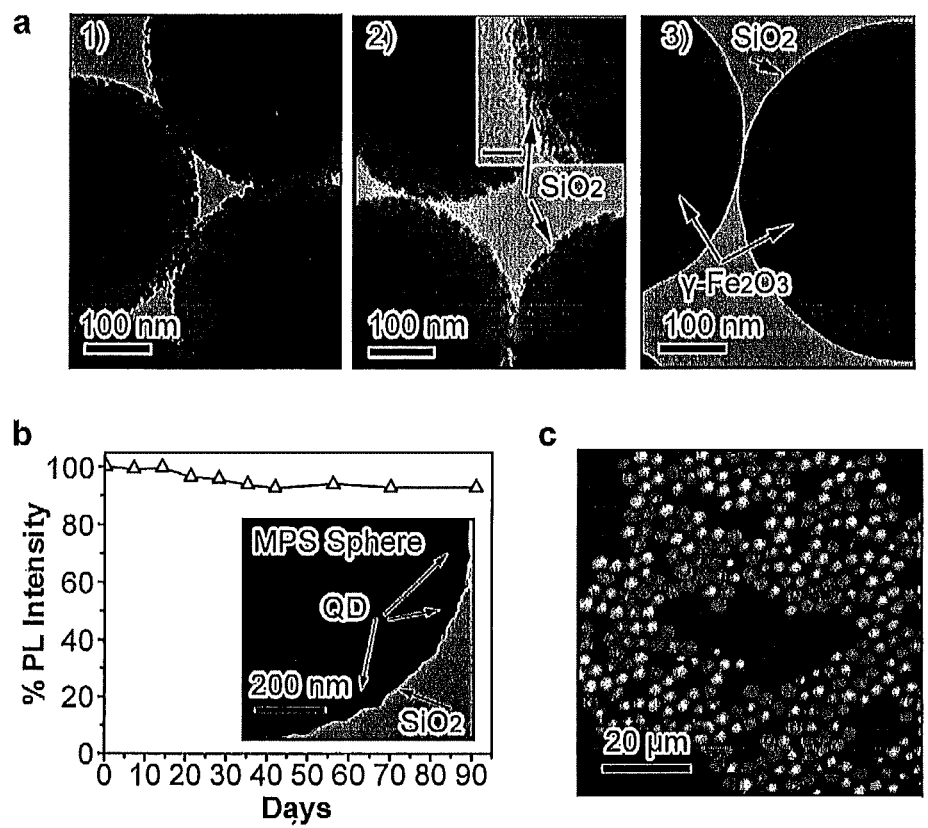
FIG. 6 shows (a) TEM images of of $\gamma$-$Fe_2O_3$ nanoparticle-capped MPS spheres prepared in the presence of CTAB: (1) before silica coating; (2) after $SiO_2$ coating with CTAB as the surfactant in aqueous NaOH solution; and (3) after additional $SiO_2$ coating using the standard Stöber process, and wherein the $\gamma$-$Fe_2O_3$ nanoparticles were originally protected by oleic acid, and the inset in (2) is the corresponding TEM image at high magnification showing the presence of a thin silica layer (scale bar: 20 nm), (b) PL intensity as a function of time after storing the MPS@QD@$SiO_2$ composite spheres in water under ambient conditions; wherein the inset is the TEM image of a portion of a MPS@QD@$SiO_2$ sphere and the surface of CdSe@CdZnS QDs was originally covered by oleic acid, and (c) confocal optical microscopy image of 3.5-μm MPS spheres loaded with QDs of two different sizes, the QDs of different colors were assembled on MPS spheres separately and then mixed together for imaging, and wherein the sample was excited with a focused 488 nm line of $Ar^+$ laser.

The nanoparticle-capped MPS composites are first transferred to aqueous phase by using additional surfactants to adsorb onto the surface of composite spheres through the formation of bilayer structures, as illustrated in FIG. 5a. The phase transfer makes it convenient to subsequently grow a silica layer using the well-known Stöber method. The formation of a bilayer through hydrophobic-hydrophobic interaction also helps preserve the original ligands on the nanocrystal surface. For example, an anionic surfactant, sodium dodecyl sulfate (SDS), was used to mediate the silica coating of oleic acid capped MPS@γ-$Fe_2O_3$ composite spheres. After SDS adsorption, the MPS@γ-$Fe_2O_3$ composites were transferred into an ammonia/water/ethanol mixture and directly coated with uniform silica shells upon careful addition of TEOS. FIG. 5b displays typical images of $SiO_2$ overcoated MPS@γ-$Fe_2O_3$ spheres. The thickness of the silica shell can be tuned from ten to several hundred nanometers by simply changing the amount of TEOS precursor. Interestingly, silica seems to initially nucleate on the individual nanoparticle surface and then grow independently before they eventually merge into a single layer. As a result, the silica coating possesses a rough surface until it reaches a thickness of approximately 100 nm. SDS has been demonstrated to be very effective in assisting the silica coating of composite spheres capped with various nanoparticles. This silica coating method assisted by SDS surfactant is universal for other hydrophobic nanoparticles-capped MPS spheres. In fact, the process has little to do with the compositions of nanoparticles and can be applied to passivate various nanoparticle/MPS systems as long as the additional surfactants can disperse these nanoparticles in the mixture of ethanol/$H_2O$/$NH_3$, which is the chemical environment required for the Stöber method for silica coating. FIG. 5c demonstrates a few more examples of normal silica passivated MPS@nanoparticle assemblies, with the nanoparticles being Au dots, TiO$_2$ rods, and ZrO$_2$ dots. Due to their small size compared to that of the MPS spheres, the nanoparticles cannot be individually identified in the TEM images and only a dark ring can be observed within the silica coating. Other exemplary surfactants, such as CTAB, can also be used to mediate silica coating on composite spheres. As shown in FIG. 6a with MPS@γ-Fe$_2$O$_3$ as an example, a previously reported method to first deposit a thin silica coating of a few nanometers on the composite surface by hydrolyzing TEOS in aqueous solution of CTAB with dilute NaOH solution as catalyst was adapted. The thickness of the silica layer can be further increased by an additional step of standard Stöber process. Unlike the case using SDS, this two-step procedure produces a very smooth silica surface even at a relatively small thickness. This procedure is especially useful for coating TOPO-capped MPS@QD spheres because CTAB causes smaller disturbance to the luminescence of QDs than SDS. FIG. 6b demonstrates the high stability of the PL of MPS@QD@SiO$_2$ composites, with the TEM image of a portion of a typical sphere shown in the inset. The decrease of PL intensity is only about 10% even after 3 months of storage in water, which is significantly better than that of typical ligand-exchanged QDs. Surface passivation provided by silica and the intact ligand protection are the two main reasons for this excellent optical stability. FIG. 6c shows a multicolor fluorescence microscopy image of a mixture of two types of "monochromatic" MPS@QD@SiO$_2$ spheres with an average diameter of 3.5 µm. These green and red spheres were prepared separately by using single-color quantum dots with emission wavelengths at 545 and 610 nm, respectively, and then mixed and imaged under a single wavelength light. All the spheres are observed with clearly distinguishable emission colors.

The necessity of MPS for high density thiol groups may appear as a limitation because MPS has only been produced in the form of microspheres and the functional nanoparticles can only be attached to the external surface of the spheres in the form of a monolayer. On the other hand, normal colloidal silica is well-known for its ability to form a conformal coating on various nanostructures with a high degree of control over the thickness. The assembly process comprises coating mercapto-silica onto the surface of other nanoscale objects so that further nanoparticle assembly can occur on hosts with more complex morphologies than spheres.

In accordance with an exemplary embodiment, the process includes first coating nano-objects such as dots, rods and wires with normal silica, and then introducing mercapto-silica to the surface through a co-condensation method. In the second step, multiple injections of the precursors are applied. The ratio of MPS to TEOS gradually increased for every injection to ensure a high density of thiol groups on the surface. The thiol-functionalized layer had been characterized by FTIR spectroscopy. After coating the normal silica spheres with an MPS layer, two bands in the ranges of 2950-2850 cm$^{-1}$ and 2600-2500 cm$^{-1}$ appeared, which can be attributed to the C—H and S—H stretching of the attached propanethiol groups. The relatively strong absorption of C—H and S—H stretching in the IR spectrum indicates that the loading of thiol groups is significantly higher than that of colloidal silica spheres modified with MPS silane using conventional grafting methods (where only a sub-monolayer of MPS can be attached).

The ability to form MPS coatings on normal silica surfaces opens the door to the fabrication of a large variety of multifunctional composite nanostructures. Functional materials can now be incorporated as cores inside normal silica, whose surface can be modified with high density thiol groups for attaching other types of functional nanoparticles. Here, a Fe$_3$O$_4$@SiO$_2$&MPS@QD@SiO$_2$ multilayer structure was demonstrated by using the simple solution phase assembly processes. First, superparamagnetic Fe$_3$O$_4$ particles with a diameter of approximately 100 nm were coated with SiO$_2$. After coating with a MPS layer, QDs were assembled on the surface, and subsequently another layer of SiO$_2$ was coated to make the composites water dispersible. The product exhibits strong fluorescence under UV excitation and superparamagnetic property that allows fast magnetic separation using an external magnet.

Figure 7:
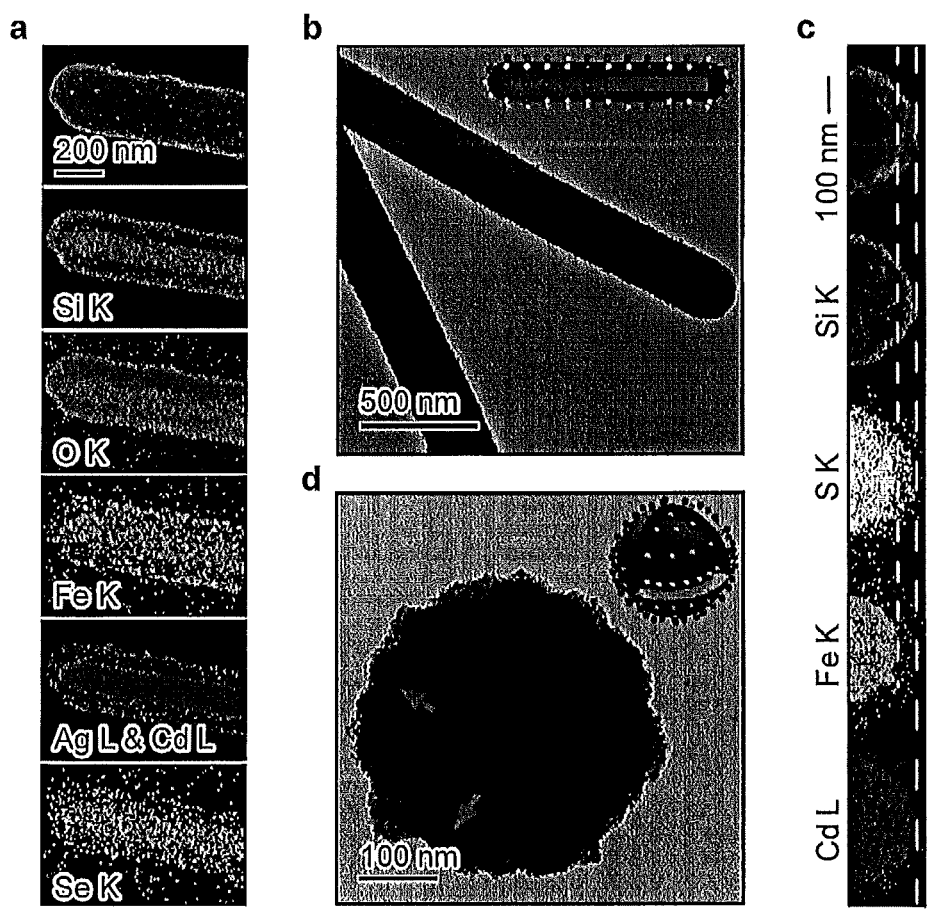
FIG. 7 shows (a,b) SEM image and EDX mapping (a) and TEM image (b) of the elemental distribution of Ag nanowire@$SiO_2$&MPS@CdSe&$\gamma$-$Fe_2O_3$ composite nanowires, wherein the Ag nanowires were synthesized by using a polyol process in the presence of poly(vinyl pyrrolidone) (PVP), surface coated with normal silica using the Stöber process, modified with MPS layer, and then decorated with TOPO/oleylamine-capped CdSe and oleic acid-capped $\gamma$-$Fe_2O_3$ nanoparticles, and (c,d) SEM images and EDX mapping of the elemental distribution (c) and TEM image (d) of a MPS@$\gamma$-$Fe_2O_3$@$SiO_2$&MPS@CdSe multilayer composite, synthesized by sequential procedures including initial loading of oleic acid capped $\gamma$-$Fe_2O_3$ nanoparticles on MPS spheres, surface coated with normal silica using the Stöber process, modified with MPS layer, and then decorated with TOPO/oleylamine capped CdSe nanoparticles, and wherein insets in (b) and (d) are schematic illustrations of the assembled structures.
Figure 8:
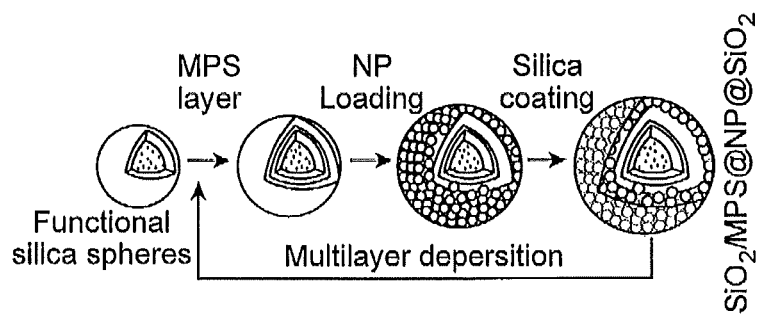
FIG. 8 shows a schematic illustration showing the procedure of self-assembly of hydrophobic nanoparticles on MPS spheres in accordance with an exemplary embodiment.
Figure 9:
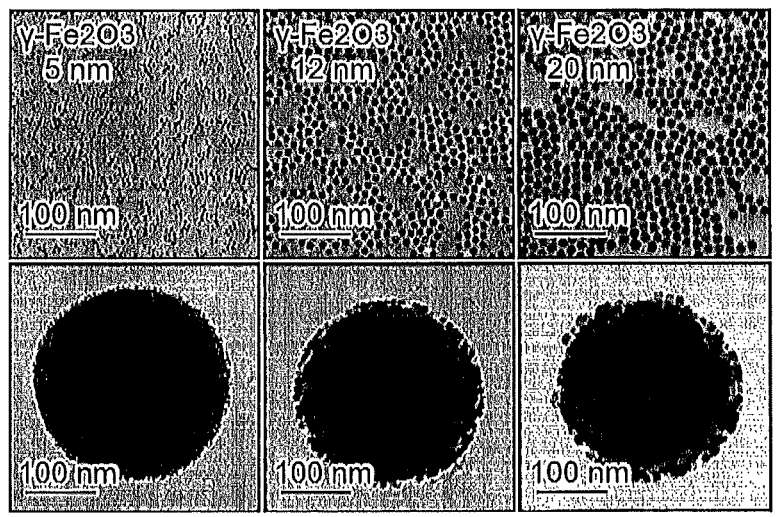
FIG. 9 shows TEM images of $\gamma$-$Fe_2O_3$NPs assembled on the surface of MPS spheres, wherein the upper row shows the of $\gamma$-$Fe_2O_3$NPs with different size (5 nm, 12 nm and 20 nm) and the lower row represents the corresponding of $\gamma$-$Fe_2O_3$ NP capped MPS spheres.
Figure 10:
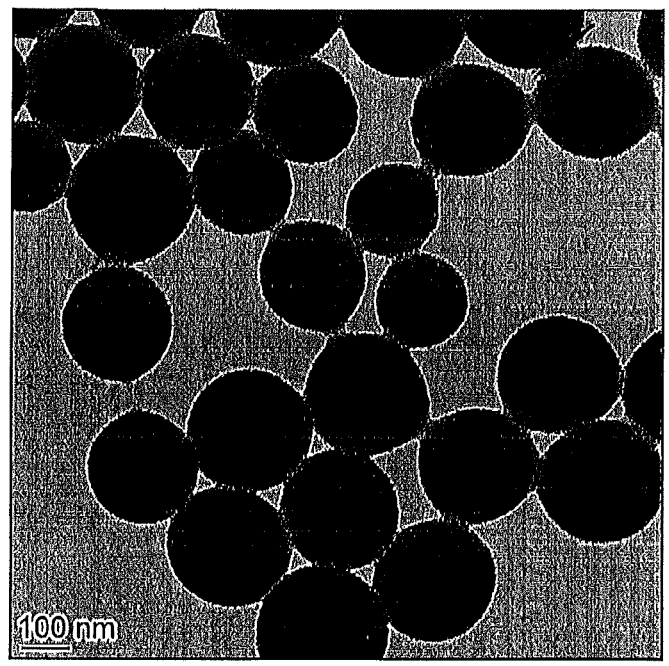
FIG. 10 shows low magnification TEM image of $ZrO_2$ nanoparticles assembled on the surface of MPS spheres.
Figure 11:
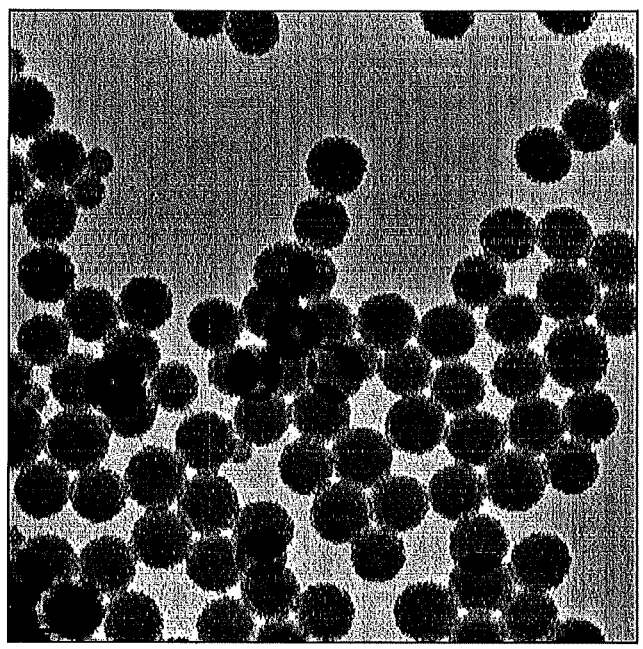
FIG. 11 shows low magnification TEM image of CdSe and $\gamma$-$Fe_2O_3$ nanoparticles assembled on the surface of MPS spheres.
Figure 12:
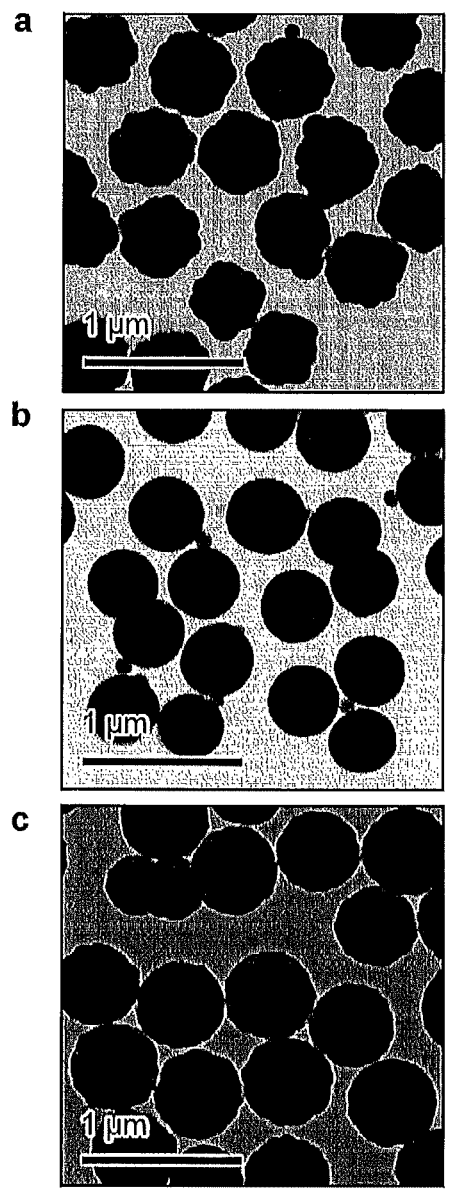
FIG. 12 shows low magnification TEM images of silica coated various composites assisted by SDS surfactant: (a) MPS@Au@$SiO_2$, (b) MPS@$TiO_2$ rods@$SiO_2$ and (c) MPS@$ZrO_2$@$SiO_2$, and wherein the Au nanoparticles were originally proteced by dodecylamine (Cl2N), $TiO_2$ nanorods by oleic acid, and $ZrO_2$ nanodots by TOPO.
Figure 13:
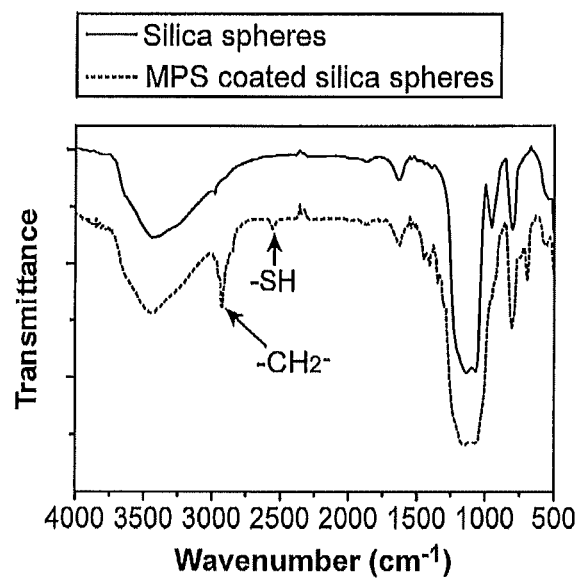
FIG. 13 shows FTIR spectra of normal silica spheres before and after coating with an additional MPS layer, and wherein the relatively strong absorption of C—H and S—H stretching indicates the high loading of thiol groups introduced during the modification.
Figure 14:
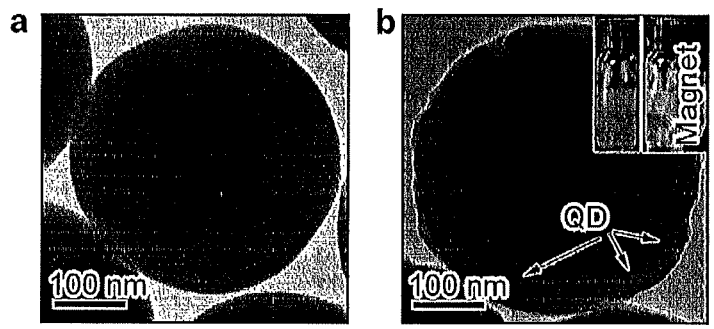
FIG. 14 shows TEM images of (a) original $Fe_3O_4$@$SiO_2$ particles and (b) corresponding $Fe_3O_4$@$SiO_2$&MPS@CdSe@$SiO_2$ composite structures, wherein the superparamagnetic $Fe_3O_4$ particles were synthesized using a high temperature precipitation reaction in the presence of polyacrylic acid (PAA), surface coated with normal silica using the Stöber process, modified with MPS layer, and then decorated with oleic acid-capped CdSe@CdZnS QDs, and then surface protected by another layer of normal $SiO_2$ with the assistance of CTAB surfactant, and the insets are corresponding photographs of an aqueous dispersion of the composite particles excited by an ultraviolet lamp: the left sample is a normal dispersion while the right one is exposed to a magnetic field

The process also allows the functionalization of nonspherical objects. As a demonstration, Ag@SiO$_2$&MPS@γ-Fe$_2$O$_3$&QD multilayer composite nanowires were prepared using this simple assembly processes. Silver nanowires were synthesized using a polyol process, coated with normal silica, modified with MPS, and surface-immobilized with mixed nanoparticles of γ-Fe$_2$O$_3$ and QDs. FIG. 7a shows the elemental distribution of Si, O, Fe, Ag, Cd, and Se, as analyzed by EDX mapping. Ag@SiO$_2$ cable-like structure can be easily identified by the strong Ag signal at the core and Si, O signals at the shell regions. The weaker but evenly distributed signals from Fe, Cd and Se prove the thin layer of immobilized γ-Fe$_2$O$_3$ and QDs. The uniform attachment of nanoparticles can be also clearly observed in the TEM image in FIG. 7b. The successful expansion to nonspherical morphologies makes this assembly process truly unique in comparison to conventional methods.

Analogous to the LbL approach, in accordance with an exemplary embodiment, the assembly process here also allows multilayer assembly by repeating the nanoparticle immobilization, silica coating, and MPS modification procedures. As a demonstration, MPS spheres (approximately 300 nm in diameter) were immobilized with γ-Fe$_2$O$_3$ nanoparticles on the surface, overcoated with a thin SiO$_2$/MPS layer, and immobilized QDs on the surface again. FIGS. 7c and 7d show the EDX elemental mapping and a typical TEM image of a multilayer MPS@γ-Fe$_2$O$_3$@SiO$_2$&MPS@QD structure. The dark ring marked with arrows is the layer of γ-Fe$_2$O$_3$ nanoparticles. The gray area outside this ring is the SiO$_2$&MPS layer with thickness of approximately 50 nm. QDs can be clearly seen on the sphere surface. As indicated by the two dotted lines in FIG. 7c, the different locations of Fe and Cd (150 nm for Fe, 200 nm For Cd from the sphere's center) clearly suggests that the γ-Fe$_2$O$_3$ nanoparticles and QDs are distributed within different layers of the composite. The gap between these two nanoparticle layers is 50 nm which corresponds to the thickness of SiO$_2$&MPS layer. Interestingly, a strong S signal is also observed in this gap, indicating high loading of thiol groups in this layer. All these observations confirm the complex structure with multiple types of nanoparticles positioned at different layers. This multilayer assembly strategy not only provides the means to improve the loading capacity, but also makes it convenient to increase the number of functions while maintaining the loading density of each component.

Materials and Methods

In accordance with exemplary embodiments, detailed synthesis recipes, additional TEM images of various MPS@NP composite spheres and silica passivated assemblies, FTIR spectra showing MPS coating, results demonstrating MPS@Au&γ-Fe$_2$O$_3$@SiO$_2$ composite structures as magnetically recoverable catalysts, and TEM images showing the assembly of hydrophilic nanoparticles are described below.

Materials

Tetraethyl orthosilicate (TEOS), (3-mercaptopropyl)trimethoxysilane (MPS), sodium dodecyl sulfate (SDS), cetyl trimethylammonium bromide (CTAB), tetraoctylammonium bromide (TOAB), dodecylamine (C12N), 1-dodecanethiol (C12S), ammonium hydroxide solution (approximately 28% $NH_3$ in water), oleylamine, trioctylphosphine oxide (TOPO), trioctylphosphine (TOP), tannic acid, sodium citrate tribasic dihydrate (99%), bis (p-sulfonatophenyl) phenylphosphine dihydrate dipotassium salt (BSPP, 97%), iron pentacarbonyl ($Fe(CO)_5$), dioctyl ether, trifluoroacetic acid (TFA), phosphoric acid, cuprous acetate (CuOAc, 97%), 1-octadecene (ODE, 90%), Poly(acrylic acid) ($M_w$=1,800), cadmium nitrate tetrahydrate, sodium myristate, selenium, zinc oxide, cadmium oxide, sulfur, oleic acid and nickel(acetylacetonate)$_2$ were purchased from Aldrich Chemical Co. Hydrogen tetrachloroaurate(III) trihydrate ($HAuCl_4.3H_2O$, 99.9+%) was purchased from Acros Organics. Tetrabutyl orthotitanate (TBOT) and titanium tetrachloride ($TiCl_4$) were obtained from Fluka. Anhydrous iron (III) chloride (98%) was purchased from Riedel-de Haën. Diethylene glycol (reagent grade), ethyl alcohol (denatured), hydrochloric acid (36.5-38%), toluene (99.8%) and sodium hydroxide (98.8%), cyclohexane and acetone were obtained from Fisher Scientific. All chemicals were used as received without further treatment.

Synthesis of MPS Spheres

MPS spheres were prepared by using a one-pot procedure. (See Nakamura et al., *J. Phys. Chem. C* 2007, 111, 18892; and Lu et al., *Langmuir* 2011, 27, 3372.) In an exemplary synthesis, 120 µL MPS precursor was added to 30 mL of 1% ammonia aqueous solution and vigorously shaken for 1 minute at a speed of 2500 rpm. The mixture was then incubated at room temperature for 12 hours. The final products were washed with 0.01 M NaOH aqueous solution and ethanol several times and then dispersed in 10 mL of toluene. The size of MPS spheres can be tuned systematically by changing the amount of MPS precursor.

Synthesis of $TiO_2$ Nanoparticles $TiO_2$ nanodots were prepared by a nonhydrolytic solution-based reaction. (See Trentler et al., *J. Am. Chem. Soc.* 1999, 121, 1613). Trioctylphosphine oxide (5 g) was heated at 150° C. for 5 minutes in vacuum. After increasing the solution temperature to 200° C. under $N_2$ atmosphere, titanium tetrabutoxide (1.4 mL) was injected into the hot solution. The resulting mixture was then heated to 320° C., followed by rapidly adding 0.55 mL of $TiCl_4$. The solution was further heated for 20 minutes at 320° C. to ensure the complete reaction. After cooling the system down to 80° C., 10 mL of acetone was added to yield a white precipitate, which was isolated by centrifugation and subsequently washed with a cylcohexane/acetone mixture to remove extra surfactant. The resulting powder was re-dispersed in 10 mL of cyclohexane.

Synthesis of $TiO_2$ Nanorods $TiO_2$ nanorods were synthesized using a high-temperature pyrolysis reaction. (See Joo et al., *J. Phys. Chem. B* 2005, 109, 15297). Oleic acid (22 mL) was heated at 150° C. under vacuum for 1 hour. Then titanium isopropoxide (7 mL) was injected after the solution was cooled to room temperature under $N_2$ flow. The mixture was then heated to 270° C. and kept at this temperature for 2 hours. Ethanol (40 mL) was added after the solution was cooled down to 80° C. The white precipitate was collected by centrifugation and washed with cyclohexane/ethanol mixture several times. The final product was re-dispersed in 20 mL of cyclohexane.

Synthesis of $\gamma$-$Fe_2O_3$ Nanocrystals

Superparamagnetic $\gamma$-$Fe_2O_3$ nanocrystals were synthesized using a thermolysis process. (See Hyeon et al., *J. Am. Chem. Soc.* 2001, 123, 12798). $Fe(CO)_5$ (0.2 mL, 1.52 mmol) was added to a mixture containing 10 mL of octyl ether and 1.28 g of oleic acid at 100° C. The solution was then heated to 290° C. under an argon atmosphere and maintained at this temperature for 1 hour. After cooling down to 200° C., the solution was bubbled with air for 2 hours. After cooling down to room temperature, ethanol was added to the solution to precipitate $\gamma$-$Fe_2O_3$ nanoparticles, which were then separated by centrifugation. Finally, the resulting black powder was re-dispersed into 10 mL cyclohexane.

Synthesis of CdSe Nanoparticles

CdSe nanoparticles were prepared using a well established method reported by Peng group. (See Peng, et al., *J. Am. Chem. Soc.* 2002, 124, 3343). CdO (0.0254 g), stearic acid (0.228 g) and TOPO (3.88 g) were mixed in a 100 mL flask, then heated to 150° C. in vacuum for 30 min. After that, the mixture was heated to 320° C. under Ar flow to form light yellow solution. 2 mL oleylamine was injected later and after the temperature reached 320° C. again, the Se solution (0.722 g Se powder in 5 mL TOP) was quickly injected. And then, the reaction temperature was set at 290° C. and aged for 3 minutes. After the solution was quickly cooled down to 80° C., 5 mL of toluene was added. The CdSe nanoparticles were precipitated by ethanol and collected by centrifugation. After wash with toluene/ethanol one more time, the final product was re-dispersed into 5 mL toluene.

Synthesis of CdSe@CdZnS Nanoparticles (QD)

CdSe@CdZnS nanoparticles were prepared by a reproducible method reported by Dubertret group. (See Carion et al., *Nat. Protocols* 2007, 2, 2383). First, four reagents were prepared exactly based on the reference (1) Cadmium myristate (2) Cd(oleate)$_2$ 0.5 M in oleic acid (3) Zn(oleate)$_2$ 0.5 M in oleic acid and (4) TOPS 0.5 M solution in TOP. Later, 1-octadecene (16 mL), Cadmium myristate (170 mg) and selenium (12 mg) were mixed in a flask, and kept at room temperature in vacuum for 1 hour. After that, the solution was heated up to 240° C. under Ar atmosphere and aged for 10 min, followed by injection of 1 mL oleic acid and wait a further 2 minutes. After cooling the solution down to room temperature, the CdSe nanoparticles were precipitated by adding excess ethanol and then harvested by centrifugation. The resulting powder was re-dispersed in 10 mL of chloroform as a CdSe stock solution.

CdZnS shell coating: trioctylamine (8 mL), CdSe stock solution (2 mL), Zn(oleate)$_2$ stock solution (400 µL) and Cd(oleate)$_2$ stock solution (200 µL) were mixed in a flask. Then, the mixture was degassed under vacuum for 1 hour and heated to 300° C. under Ar atmosphere. Mixture of 4.4 mL trioctylamine and 0.6 mL TOPS was slowly added to the hot solution using a syringe pump at the rate of 10 mL/h. The final mixture solution was kept at 300° C. for 2 hours. The core/shell CdSe@CdZnS nanoparticles were precipitated by ethanol and finally dispersed in 5 mL of cyclohexane.

Synthesis of $ZrO_2$ Nanoparticles

The preparation method is similar to the $TiO_2$ nanopaticles. (See Joo et al., *J. Am. Chem. Soc.* 2003, 125, 6553). TOPO (10 g) was heated at 150° C. for 30 minutes in vacuum. After cool the solution temperature to 60° C. under $N_2$ atmosphere, zirconium(IV) isopropoxide propanol complex (1.56 g) and $ZrCl_4$ (1.16 g) were added into the solution. The resulting mixture was then heated to 340° C. and further heated for 2 hours at 340° C. to ensure the complete reaction. After cooling the system down to 80° C., 20 mL of acetone was added to yield a white precipitate, which was isolated by centrifugation and subsequently washed with a cylcohexane/acetone mixture to remove extra surfactant. The resulting powder was re-dispersed in 20 mL of cyclohexane.

Synthesis of NiO Nanoparticles

The NiO nanoparticles were synthesized by the hot injection method according to the previous report. (See Park et al., *Adv. Mater.* 2005, 17, 429). In an exemplary embodiment, TOP (5 g) was heated at 120° C. for 30 minutes in vacuum, and then increasing the temperature to 230° C. under Ar atmosphere. After that, a mixture of nickel(acetylacetonate)$_2$ (0.5 g) and oleylamine (2 mL) was quickly injected and the solution was aged for 20 minutes. After cooling down to 160° C., the solution was bubbled with air for 1 hour. Ethanol was added to the solution to precipitate NiO nanoparticles, and then retrieved by centrifugation. The final black powder was redispersed in 10 mL cyclohexane after washing two times Synthesis of NaYF$_4$:Yb,Er Nanocrystals Upconversion fluorescent NaYF$_4$:18% Yb, 2% Er nanocrystals were synthesized according to the reference, Li et al., *Adv. Mater.* 2008, 20, 4765. YCl$_3$.6H$_2$O (242.7 mg), YbCl$_3$.6H$_2$O (70.0 mg) and ErCl$_3$.6H$_2$O (7.6 mg) were dissolved in 200 µL water first and then mixed with oleic acid (6 mL) and 1-octadecene (15 mL) in a 100 three-neck flask. The solution was degassed at 150° C. under Ar for 30 min, and then cooled down to room temperature. 10 mL of methanol solution containing NaOH (0.1 g) and NH$_4$F (0.1481 g) was added and stirred for 30 minutes. After that, the solution was slowly heated to 110° C. and kept at 110° C. for 0.5 hours to remove methanol and small amount of water. During this period, one neck of the flask was left open under the flow of Ar gas. Then, the solution was quickly heated to 320° C. and aged for 1 hour under Ar protection. After the solution as cooled down, acetone was added to precipitate the nanoparticles. The final NaYF$_4$:Yb,Er nanocrystals was redispersed in 5 mL of cyclohexane after washing with cyclohexane/acetone two times.

Synthesis of Cu$_2$S nanoparticles

Cuprous acetate (0.0488 g), TOPO (1 g), and 1-octadecene (30 mL) were mixed in a three-neck flask and then degassed under argon flow for 30 min. Upon heating the solution up to 160° C., 1-dodecanethiol (1 mL) was injected quickly into the flask under vigorous stirring. The resulting mixture was further heated to 200° C. (for the small nanoparticles, the temperature is kept at 185° C.) and then reacted for 4 hours. The product was collected by adding an excess amount of methanol. After wash 2 to 3 times with toluene/methanol, the final Cu$_2$S nanoparticles were dispersed in 5 mL toluene. (See Wang et al., *Inorg. Chem.* 2010, 49, 6601).

Synthesis of Hydrophobic Au Nanoparticles

Au nanoparticles capped with TOAB in toluene were synthesized by using biphasic reduction procedure. (See Brust et al., *Chem. Commun.* 1994, 801). In accordance with an exemplary synthesis, a biphasic TOAB solution was prepared by dissolving TOAB (0.365 g) in toluene (13.3 ml), followed by the addition of 5 mL HAuCl$_4$ solution (0.01 g/mL). After vigorous stirring for 10 minutes, the color of the toluene phase became orange. After that, sodium borohydride solution (56.8 mg dissolved in 2 mL water) was added dropwise. The color changed from orange to colorless to purple to eventually reddish. The resulting mixture was further stirred for 2 hours to ensure monodispersity. The final products were washed with dilute H$_2$SO$_4$ (1M) one time and distilled water several times.

200 mg dodecylamine (Cl2N) or 1-dodecanethiol (Cl2S) was added to 2 mL of the above Au nanoparticle solution. The mixture was stirred for 3 to 4 hours at room temperature. Then 5 mL ethanol was added to precipitate the Au nanoparticles. After centrifugation, the Au nanoparticles can be redispersed in 2 mL toluene. In order to fully replace the original capping agent, this wash step can be repeated several times.

Assembly of Nanoparticles on MPS Spheres

Nanoparticles were assembled on the surface of MPS spheres by simply mixing them in nonpolar solvents such as toluene or cyclohexane. 500 µL of as-synthesized nanoparticles were added to 10 mL toluene dispersion of MPS spheres. Then, the mixture was votexed for 20 minutes at a speed of 500 rpm, followed by washing with nonpolar solvents a few times to remove free nanoparticles. Generally, the amount of nanoparticles is in excess compared to that of the MPS spheres.

For quantifying the QD loading on MPS spheres (FIG. 4), the concentration of as-synthesized QDs was calculated using the amount of limiting reagent selenium (2.4 mg), the density of CdSe, the final particle size and the volume of solvent toluene (5 mL). After diluted 100 times, the concentration of QDs is about $10^{14}$ nanoparticles per mL, which is consistent with the results measured from UV-Vis adsorption spectrum by Leatherdale et al. (See *J. Phys. Chem. B* 2002, 106, 7619). The concentration of the MPS spheres can be estimated at $2\times10^{10}$ spheres per mL using the similar method. QD solution in toluene (500 µL) was mixed with different amount of MPS dispersion (0 to 500 µL) and pure toluene to obtain a total volume of 1 mL. After shaking 1 hour and subsequent centrifugation, PL of the supernatants was directly recorded and the precipitates were studied by TEM.

Silica Overcoating

For SDS assisted silica coating of $\gamma$-Fe$_2$O$_3$, Au, ZrO$_2$ and TiO$_2$ nanoparticle-capped MPS spheres, after washing and centrifugation, the precipitate was dissolved by 3 mL of aqueous solution of SDS (5.6 mg/mL) and sonicated for 10 minutes. The mixture was then heated to approximately 80° C. in a water bath for 1 hour to evaporate the remaining trace amount of toluene. The reaction solution was cooled down to room temperature and washed with water one time and re-dispersed in 3 mL of water. Then, ammonium hydroxide aqueous solution (1 mL, 28%), ethanol (20 mL), and TEOS (50 µL) were added to the solution sequentially. After stirring for 20 min, the core/shell colloids were collected by centrifugation and washed with ethanol three times.

For CTAB assisted silica coating, $\gamma$-Fe$_2$O$_3$ capped or QD-capped MPS spheres were first washed and centrifuged after assembly. Then 3 mL of aqueous solution of CTAB (10 mg/mL) was used to mediate the transfer of nanoparticle-capped MPS spheres to water. The composite spheres were re-dispersed in 15 mL H$_2$O, mixed with aqueous NaOH solution (100 µL, 0.1 M), added 50 µL of methanol solution of TEOS (20% in volume) three times at 30-min intervals, reacted for 2 days under stirring, and then washed with ethanol three times. In order to grow a thicker silica layer, the thin-layer-silica coated composite particles were re-dispersed in water (3 mL), sequentially mixed with ammonia aqueous solution (1 mL, 28%), ethanol (20 mL), and TEOS (30 µL), and reacted for 20 min under vigorous stirring. The core/shell colloids were finally collected by centrifugation and washed with ethanol three times.

Coating of MPS Layer onto the Normal Silica Surface

Nanostructures covered with normal silica such as normal silica beads prepared by Stöber method, Fe$_3$O$_4$@SiO$_2$, Ag wire@SiO$_2$, or MPS@$\gamma$-Fe$_2$O$_3$@SiO$_2$, with a preferred amount of approximately 20 mg, was dispersed in 3 mL water, mixed with 1 mL of ammonia (28%) and 20 mL of ethanol, after which a mixture of MPS and TEOS (20 µL, volume ratio 1:1) was added, and reacted for 20 min. After that, 20 µL of MPS/TEOS mixture (volume ratio: 5:1) was injected and reacted for another 20 minutes. The final products were washed with ethanol three times and re-dispersed in nonpolar solvent for subsequent nanoparticle immobilization.

Synthesis of Silica Coated Superparamagnetic Iron Oxide ($Fe_3O_4@SiO_2$)

The $Fe_3O_4$ were synthesized in solution phase at high temperature. (See Ge et al., *Angew. Chem. Int. Ed.* 2007, 46, 4342). An NaOH/DEG stock solution was prepared by dissolving NaOH (50 mmol) in DEG (20 mL); this solution was heated at 120° C. for 1 hour under nitrogen, cooled, and kept at 70° C. A mixture of PAA (4 mmol), $FeCl_3$ (0.4 mmol), and DEG (17 mL) was heated to 220° C. in a nitrogen atmosphere for 30 min with vigorous stirring to form a transparent, light yellow solution. NaOH/DEG stock solution (1.75 mL) was injected rapidly into the above hot mixture. The reaction solution was further heated at 220° C. for 1 hour. The final products were washed with a mixture of deionized water and ethanol several times and then dispersed in deionized water.

$Fe_3O_4@SiO_2$ core-shell colloids were prepared through a modified Stöber process. (See Ge et al., *Adv. Mater.* 2008, 20, 3485). In an embodiment, an aqueous solution (3 mL) containing $Fe_3O_4$ (approximately 20 mg) was mixed with ethyl alcohol (20 mL), aqueous ammonia (28%, 1 mL) under vigorous magnetic stirring. TEOS (0.1 mL) was injected into the solution every 20 minutes until the total amount of TEOS reaches 0.5 mL.

Synthesis of Silica Coated Ag Wire (Ag wire@$SiO_2$)

Silica coated Ag wire was prepared using a polyol process. (See Yin et al., *Nano Lett.* 2002, 2, 427). $PtCl_2$ ($2\times10^{-5}$ g) was dissolved in 0.5 mL ethylene glycol and then added to 5 mL of ethylene glycol (heated to 160° C.) under continuous magnetic stirring. After 4 min, 2.5 mL ethylene glycol solution containing $AgNO_3$ (0.05 g) and 5 mL ethylene glycol solution of PVP (MW approximately 40,000, 0.2 g) were added together to the ethylene glycol containing platinum seeds. This reaction mixture was then constantly heated at 160° C. for another 60 minutes. This mixture was centrifuged at approximately 4000 rpm to separate the silver nanowires from colloidal particles.

Approximately 2 mg of the silver nanowires were dispersed into a mixture of 20 mL 2-propanol, 4 mL deionized (DI) water and 0.4 of 28% ammonia solution. Then, 100 μL of TEOS was added to the mixture under magnetic stirring and reacted for 30 minutes. The silica coated silver wire can be collected by centrifugation at 4000 rpm and washed by ethanol for two times.

Preparation of Magnetic Catalyst (Calcined MPS@Au&γ-$Fe_2O_3@SiO_2$)

500 μL of nanoparticles dispersion in cyclohexane (mixture of TOAB protected Au and γ-$Fe_2O_3$ nanoparticles at a particle number ratio of 10:1) were added to 10 mL toluene dispersion of MPS spheres. Then, the mixture was shaken for 20 min, followed by washing with nonpolar solvents a few times to remove free nanoparticles. After coating a layer of silica with assisted by SDS surfactant, the composites were dispersed in water and refluxed for 20 min to make the silica porous. (See Hu et al. *Phys. Chem. Chem. Phys.,* 2010, 12, 11836). Later, the porous composites were calcined at 500° C. for 2 h to remove the protecting ligands on the nanoparticles.

Figure 15:
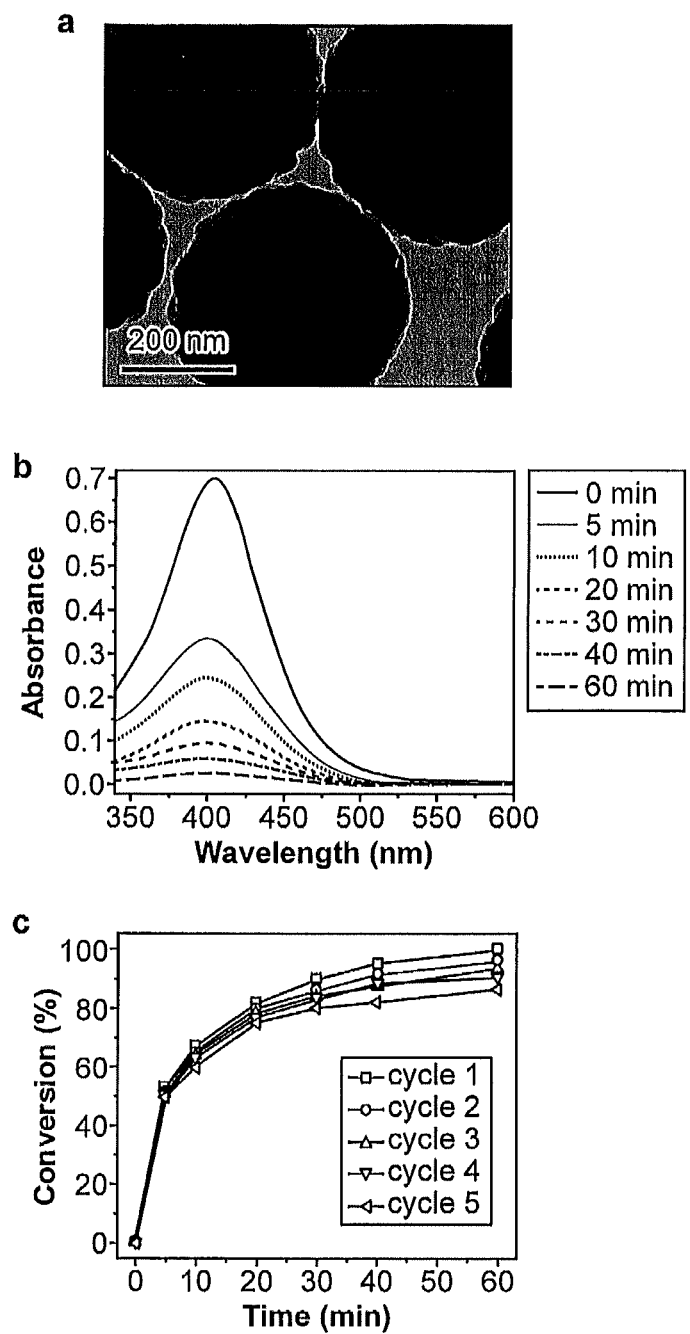
FIG. 15 shows (a) a TEM image of silica coated Au and $\gamma$-$Fe_2O_3$ nanoparticles co-assembled composites (MPS@Au&$\gamma$-$Fe_2O_3$@$SiO_2$), (b) UV-vis spectra showing gradual reduction of 4-NP by using MPS@Au&$\gamma$-$Fe_2O_3$@$SiO_2$ composite catalyst, (c) plot of conversion of 4-nitrophenol as a function of reaction time in five successive cycles of reduction using magnetic recycling, showing that the silica protected Au nanoparticle catalysts can maintain their activity well in the five successive cycles, and wherein the conversion of 4-NP drops only slightly primarily because small portions of the solution are removed for sampling (approximately 3% each cycle).

Reduction of 4-nitrophenol Assisted by Calcined MPS@Au&γ-$Fe_2O_3@SiO_2$ Catalyst The reduction of 4-nitrophenol by $NaBH_4$ was chosen as a model reaction for testing the efficiency of the prepared MPS@Au&γ-$Fe_2O_3@SiO_2$ catalyst. Aqueous solutions of 4-nitrophenol (0.15 mL, 0.01M) and the calcined MPS@Au&γ-$Fe_2O_3@SiO_2$ composite (5 mg) were added to de-ionized water (11 mL) in a vial under stirring. After adding aqueous $NaBH_4$ (1 mL, 0.1 M) solution, the bright yellow solution gradually faded as the reaction progressed. UV-Vis spectra of the solution were recorded during the course of the reactions. A 1 mL sample was taken from the solution at 5, 10, 20, 30, 40 and 60 min for UVN is measurements to determine the conversion of 4-nitrophenol. The catalyst was quickly recovered from the solution using an external magnet field, rinsed with water and dispersed into water. The recovered catalyst was then re-dispersed into a mixture of new reactants to initiate another reaction cycle. The same procedure was performed in the additional 4 cycles. The performance and recyclability of the catalyst was shown in FIGS. 15*b* and 15*c*. When a small amount of the MPS@Au&γ-$Fe_2O_3@SiO_2$ catalyst was introduced into the solution, the absorption at 400 nm decreased, indicating the reduction of 4-nitrophnol. As shown in FIG. 15*c*, the catalysts are still highly active after 5 successive cycles of the reaction. The multilayer nanocomposite structure containing both Au and γ-$Fe_2O_3$ nanoparticles designed here have several advantages as a catalyst. First, it can be recovered efficiently from the reaction solution by using external magnetic fields without significant losses. Second, the outer $SiO_2$ framework can stabilize the catalyst nanoparticles and prevent their aggregations.

Synthesis of Hydrophilic Au Nanoparticles

Au nanoparticles were prepared by following published procedures. (See Liao et al., *Appl. Phys. A: Mater. Sci. Process.* 2003, 76, 541). Briefly, a 20 mL of aqueous solution containing 4 mL of 1% (w/w) trisodium citrate and 0.08 mL of 1% (w/w) tannic acid was rapidly added to an 80 mL aqueous solution containing 1 mL of 1% (w/w) hydrogen tetrachloroaurate(III) trihydrate at 60° C. Then the mixed solution was boiled for about 10 minutes under stirring. The solution was subsequently cooled down to room temperature (RT) with chilled water. A ligand exchange process was performed to enhance the stability of the as-synthesized Au nanoparticles. In brief, the AuNPs solution was mixed with an excess quantity of Bis(p-sulfonatophenyl) phenylphosphine dihydrate dipotassium (BSPP, with a concentration of 0.2 mg/mL), and then shaken overnight. (See Loweth, et al., *Angew. Chem.-Int. Edit.* 1999, 38, 1808). The resulting negatively charged Au nanoparticles are denoted as Au@BSPP.

Synthesis of Hydrophilic $Fe_3O_4$ Nanoparticles $Fe_3O_4$ nanoparticles were prepared by mixing $FeCl_2.4H_2O$ (0.4 g), $FeCl_3.6H_2O$ (1.0 g) and 0.18 mL hydrochloric acid into 5 mL water and degassed with nitrogen before using. Then, the mixture was added to an aqueous NaOH solution (50 mL, 1.5 M) under the mechanical stir with $N_2$ protection. After 0.5 h, the produced nanoparticles were centrifuged and rinsed with water several times, then re-dispersed in 20 mL water. CTAB was then coated to enhance the dispersity of the as-prepared $Fe_3O_4$ nanoparticles. The above dispersion of $Fe_3O_4$ nanoparticles (2 mL) was mixed with CTAB aqueous solution (10 mL, 10 mg/mL) and then sonicated for 0.5 to 1 hour. Then, the mixture solution was centrifuged at approximately 7000 rpm for 3 min twice for a size selection to discard the large $Fe_3O_4$ nanoparticles. The small $Fe_3O_4$ nanoparticles left in the supernatant were collected by an external magnet, rinsed with water three times and finally re-dispersed in 5 mL water. The pH value of the dispersion was tuned to approximately 4.0 by diluted HCl solution (0.001 M) for the later assembly on MPS spheres.

Assembly of Hydrophilic Nanoparticles on MPS Spheres

Figure 16:
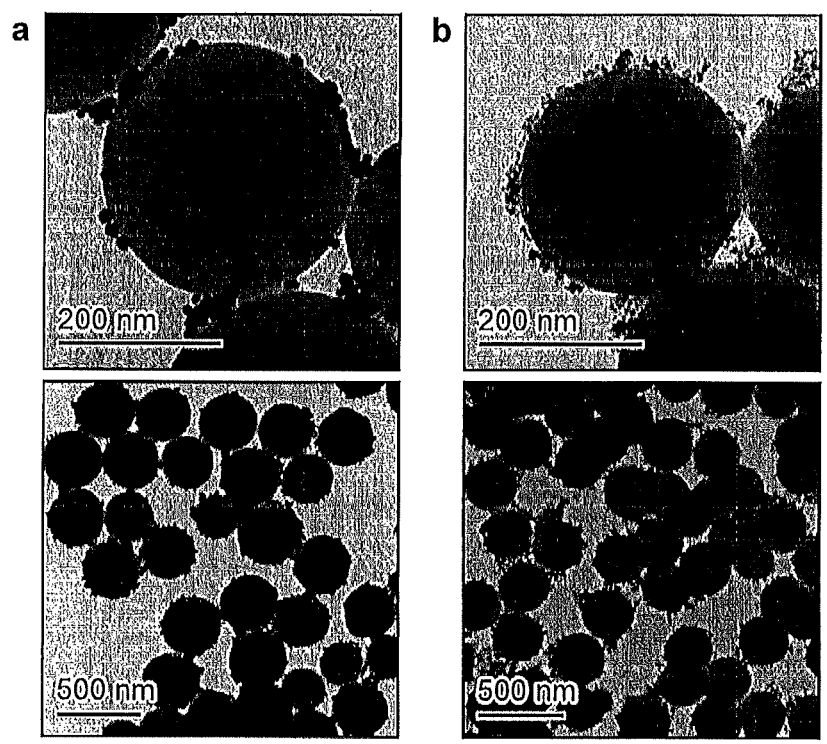
FIG. 16 shows high and low magnification TEM images of Au (a) and $Fe_3O_4$ (b) hydrophilic nanoparticles assembly on the surface of MPS spheres, wherein the Au nanoparticles were originally covered by BSPP while the $Fe_3O_4$ nanoparticles were protected by PAA.

Hydrophilic nanoparticles can also be assembled on the surface of MPS spheres by a similar mixing method in polar solvents such as ethanol and water. MPS spheres were first washed with 0.01 M NaOH aqueous solution and subsequently deionized (D.I.) water two times and then dispersed in 2 mL of D.I. water. The final pH of the aqueous MPS dispersion is about 9 to 10. Au@BSPP nanoparticles were dispersed in a mixture of ethanol and water (v/v 9:1). In accordance with an exemplary embodiment, 50 µL of MPS dispersion was added to 1 mL of Au@BSPP or $Fe_3O_4$ nanoparticles solution. Then, the mixture was votexed for 20 minutes, followed by washing with water a few times to remove free Au@BSPP or $Fe_3O_4$ nanoparticles. The resulting TEM images of the hydrophilic nanoparticles assembly on MPS spheres are shown in FIG. 16.

In summary, a general process has been developed that allows convenient production of multifunctional colloidal particles by direct self-assembly of hydrophobic nanoparticles on host nanostructures containing mercapto-silica surfaces. The resulting composite structures can be further conveniently overcoated with a layer of normal silica to stabilize the assemblies and render them highly dispersible in water for biomedical applications. As the entire fabrication process does not involve complicated surface modification procedures, the hydrophobic ligands on the nanoparticles are not disturbed significantly so that they retain their original properties such as highly efficient luminescence. Many complex composite nanostructures with tailored functions can be conveniently produced by assembling nanoparticles of various compositions, sizes, and morphologies. Although the focus has been on the immobilization of hydrophobic nanoparticles as this has been a major challenge in the field, the developed process can be easily extended to the assembly of hydrophilic nanoparticles with minimal modifications. This universal, highly configurable, scalable and reproducible assembly process will help to produce various multifunctional structures for many important technological applications. Furthermore, nanoparticles of different compositions have different releasing behaviors depending on the strength of the specific nanoparticle-thiol interaction, thus promising for controlled drug delivery or related applications.

It will be understood that the foregoing description is of the preferred embodiments, and is, therefore, merely representative of the article and methods of manufacturing the same. It can be appreciated that many variations and modifications of the different embodiments in light of the above teachings will be readily apparent to those skilled in the art. Accordingly, the exemplary embodiments, as well as alternative embodiments, may be made without departing from the spirit and scope of the articles and methods as set forth in the attached claims.

What is claimed is:

1. A method of production of multifunctional colloidal structures comprising:
   assembling hydrophobic ligand capped nanoparticles on host nanostructures by direct self-assembly, the host nanostructures containing a mercapto-silica coating; and
   applying the colloidal structures in a multilayer assembly by repeating the mercapto-silica coating and nanoparticle immobilization process on the host nanostructures, wherein different layers introduce different functionalization of the colloidal structures.

2. The method of claim 1, wherein a surface of the host nanostructures contain ligands that form coordination bonds with the hydrophobic ligand-capped nanoparticles.

3. The method of claim 1, wherein a surface of the host nanostructure contains thiol groups.

4. The method of claim 1, wherein a surface of the host nanostructure contains amine groups, or phosphine groups, or phosphate groups, or sulfate groups, or sulfonate groups, or carboxylate groups, or quaternary ammonium ions.

5. The method of claim 1, wherein the nanoparticles are hydrophobic.

6. The method of claim 1, wherein the nanoparticles are hydrophilic.

7. The method of claim 1, comprising:
   overcoatinq the colloidal structures with a layer of silica to stabilize the assemblies of hydrophobic nanoparticles on the host nanostructures.

8. The method of claim 1, comprising:
   functionalizing nonspherical particles by coating the nonspherical particles with a silica and modifying the silica coated nonspherical particles with a high-density thiol group.

9. The method of claim 1, comprising:
   using thiol-terminated colloidal organosilica mercapto-silica particles to directly immobilize the hydrophobic ligand capped nanoparticles.

10. The method of claim 9, wherein the colloidal silica has a high-density surface loading of thiol groups.

11. The method of claim 1, wherein the mercapto-silica particles are mercapto-silica spheres.

12. The method of claim 11, comprising:
   controlling a size of the mercapto-silica spheres from 150 nm to 3.5 micrometers.

13. The method of claim 1, comprising:
   dispersing the colloidal structures in a nonpolar solvent.

14. The method of claim 1, wherein the mercapto-silica particles are formed by:
   hydrolyzing a (3-mercaptopropyl)trimethoxysilane (MPS) precursor in an ammonia solution.

15. The method of claim 14, comprising:
   immobilizing the mercapto-silica particles with $Fe_2O_3$ nanoparticles;
   overcoating the mercapto-silica particles with the $Fe_2O_3$ nanoparticles with a layer of $SiO_2$ and MPS; and
   immobilizing the overcoated mercapto-silica particles with $Fe_2O_3$ nanoparticles with $Fe_2O_3$ nanoparticles.

* * * * *